US008184427B2

(12) United States Patent
Yamazaki

(10) Patent No.: US 8,184,427 B2
(45) Date of Patent: May 22, 2012

(54) MULTILAYER CERAMIC CAPACITOR AND METHOD FOR PRODUCTION THEREOF

(75) Inventor: Youichi Yamazaki, Kagoshima (JP)

(73) Assignee: Kyocera Corporation, Kyoto-shi, Kyoto (JP)

( * ) Notice: Subject to any disclaimer, the term of this patent is extended or adjusted under 35 U.S.C. 154(b) by 489 days.

(21) Appl. No.: 12/442,346

(22) PCT Filed: Sep. 27, 2007

(86) PCT No.: PCT/JP2007/068832
§ 371 (c)(1),
(2), (4) Date: Mar. 30, 2009

(87) PCT Pub. No.: WO2008/038722
PCT Pub. Date: Apr. 3, 2008

(65) Prior Publication Data
US 2009/0225494 A1    Sep. 10, 2009

(30) Foreign Application Priority Data
Sep. 27, 2006   (JP) .................................. 2006-262519

(51) Int. Cl.
*H01G 4/06*      (2006.01)
*C04B 35/468*    (2006.01)
(52) U.S. Cl. ...................... 361/321.4; 501/138; 501/139
(58) Field of Classification Search .................. 501/138, 501/139; 361/321.4
See application file for complete search history.

(56) References Cited

U.S. PATENT DOCUMENTS

| | | | |
|---|---|---|---|
| 7,057,876 B2 * | 6/2006 | Fujioka et al. ............. | 361/321.4 |
| 7,433,173 B2 * | 10/2008 | Iwasaki et al. ............. | 361/321.4 |
| 2006/0023399 A1 | 2/2006 | Fujioka et al. | |
| 2006/0114641 A1 | 6/2006 | Iwasaki et al. | |
| 2008/0266751 A1 * | 10/2008 | Yamazaki et al. ......... | 361/321.4 |
| 2010/0067171 A1 * | 3/2010 | Yamazaki et al. ......... | 361/321.4 |
| 2010/0128414 A1 * | 5/2010 | Azuma et al. ................. | 361/313 |
| 2010/0188797 A1 * | 7/2010 | Yamazaki et al. ............. | 361/303 |

FOREIGN PATENT DOCUMENTS

JP    55-067567    5/1980
(Continued)

*Primary Examiner* — Karl Group
(74) *Attorney, Agent, or Firm* — Birch, Stewart, Kolasch & Birch, LLP

(57) ABSTRACT

Disclosed is a multilayer ceramic capacitor which has a dielectric ceramic having a dielectric layer, wherein the dielectric layer mainly comprises barium titanate, contains a crystalline particle having an average crystal diameter of 0.15 to 0.3 μm, and contains Mg in an amount of 0.5 to 2 parts by mol in terms of MgO, Mn in an amount of 0.2 to 0.5 part by mol in terms of MnO, and a first rare earth element (RE) selected from Ho, Y, Er, Tm, Yb and Lu and a second rare earth element (RE) selected from Sm, Eu, Gd, Tb and Dy in a total amount of 0.7 to 3 parts by mol in terms of $RE_2O_3$ relative to 100 parts by mol of barium titanate, the crystalline particle contains the first rare earth element and the second rare earth element in such a manner that the amount of the first rare earth element is larger than that of the second rare earth element, and the density gradients of the first rare earth element and the second rare earth element in the crystalline particle as determined from the particle boundary toward the center of the crystalline particle are −0.005 to −0.05 atm %/mm and −0.0005 to −0.005 atm %/mm, respectively. Also disclosed is a method for producing the multilayer ceramic capacitor.

3 Claims, 5 Drawing Sheets

FOREIGN PATENT DOCUMENTS

| | | |
|---|---|---|
| JP | 57-42588 | 5/1980 |
| JP | 61-101459 | 5/1986 |
| JP | 10-223471 | 8/1998 |
| JP | 2002-020165 | 1/2002 |
| JP | 2003-040671 | 2/2003 |
| JP | 2003-063863 | 3/2003 |
| JP | 2005-026342 | 1/2005 |

* cited by examiner (a)

(b)

ced dielectric layers containing barium titanate as a main component and having an average grain diameter of 0.5 μm or more shows high relative
MULTILAYER CERAMIC CAPACITOR AND METHOD FOR PRODUCTION THEREOF This application is the National Stage under 35 USC §371 of International Application Number PCT/JP2007/068832 filed on Sep. 27, 2007, which claims priority under 35 USC §119(a)-(d) of Application Number JP2006-262519 filed in Japan on Sep. 27, 2006 and Application Number JP2007-251563 filed in Japan on Sep. 27, 2007.

TECHNICAL FIELD

This invention relates to multilayer ceramic capacitors used in electronic devices, particularly a multilayer ceramic capacitor including internal electrode layers composed of Nickel (Ni) or a Ni based alloy, and the method of producing the same.

BACKGROUND ART

The capacitor main body of a multilayer ceramic capacitor includes ceramic dielectric layers and internal electrode layers alternately stacked. External electrodes are formed on end faces, where the internal electrode layers are exposed, of the capacitor main body. In recent years, reducing the thickness of and increasing the number of ceramic dielectric layers and internal electrodes to be stacked has been pursued to satisfy the demand for size-reduction and higher capacitance.

Such ceramic dielectric layers configuring a multilayer ceramic capacitor, for example, include dielectric materials mainly containing barium titanate powders. If the internal electrode layers include base metal such as Ni, they are sintered usually in nitrogen-hydrogen atmosphere in which the ceramic dielectric layers are reduced to become semiconductor. That is a problem.

In order to overcome this problem, for example, proposed is a dielectric material having a larger ratio of barium site to titanium site of barium tatanate powders than that of stoichiometric ratio (see patent document 1). Also, proposed is a dielectric material containing barium titanate powders and additives such as manganese oxide (MnO), rare earth oxide and magnesium oxide (MgO) (see patent document 2).

These proposed materials have durability against reduction and show high relative dielectric constant. Therefore, such materials have been preferably used for multilayer ceramic capacitors having thickness of 10 micrometer or more among capacitors which has already been manufactured. However, in multilayer ceramic capacitors having 5 micrometers or less as a result of reducing thickness in recent years, above-mentioned dielectric materials easily obtain grain growth, thereby reducing in number of grains disposed in one ceramic dielectric layer. Consequently, the insulating property is low and reliability in a highly accelerated life test involving application of DC voltage at high temperature is low.

More recently, a new dielectric material having high relative dielectric constant and high insulating property at a thickness of 5 μm or less (see patent document 3). The dielectric material disclosed in patent document 3 includes barium titanate powder (hereinafter, it is called BT powder) as a main component, and 0.02 wt % of alkali metal oxide as an impurity therein. The material also includes 2 or more rare earth oxides having different ion radii with at least one selected from scandium oxide and yttrium oxide, and at least one from gadolinium oxide, terbium oxide and dysprosium oxide.

Patent Document 1: Japanese Examined Patent Application No. 57-42588
Patent Document 2: Japanese Patent Application Laid-Open No. 61-101459
Patent Document 3: Japanese Patent Application Laid-Open No. 10-223471

DISCLOSURE OF INVENTION

Problems to be Solved by the Invention

As is shown in the patent document 3, the multilayer ceramic capacitor includes ceramic dielectric layers containing barium titanate as a main component and having an average grain diameter of 0.5 μm or more shows high relative dielectric constant and high insulating property. However, if the average grain diameter is less than 0.5 μm or less, the material shows low relative dielectric constant and large temperature characteristic of the capacitance as well as short highly accelerated life time and low reliability.

Therefore, an object of the present invention is provide multilayer ceramic capacitors have high relative dielectric constant, low temperature characteristic of the capacitance, long highly accelerated life time and high reliability even though the average grain diameter is less than 0.5 μm or less. Another object of the present invention is to provide a method of producing the multilayer ceramic capacitors.

Means for Solving the Problem

A multilayer ceramic capacitor according to the present invention includes ceramic dielectric layers, inner electrode layers between the plurality of ceramic dielectric layers and external electrodes electrically connected to the inner electrode layers. The ceramic dielectric layer is made of dielectric ceramic which includes crystal grains having an average grain diameter of 0.15 to 0.3 μm. The dielectric ceramic contains barium titanate as a main component, 0.5 to 2 molar parts of magnesium based on MgO per 100 molar parts of barium titanate, 0.2 to 0.5 molar parts of manganese based on MnO per 100 molar parts of barium titanate and 0.7 to 3 molar parts of a total amount of one first rare earth element (RE) selected from holmium, yttrium, erbium, thulium, ytterbium and lutetium and one second rare earth element (RE) selected from samarium, europium, gadolinium, terbium and dysprosium. The crystal grains contain the first rare earth element in a concentration greater than concentration of the second rare earth element. There is a concentration gradient of the first rare earth element from the grain boundary to the center of the crystal grain of −0.005 atom %/nm or more and −0.05 atom %/nm or less, and a concentration gradient of the second rare earth element from the grain boundary to the center of the crystal grain of −0.0005 atom %/nm or more and −0.005 atom %/nm or less.

In the multilayer ceramic capacitor, the crystal grains constituting the dielectric ceramics are preferably composite grains which include a first crystal group including crystal grains containing 0.2 or less atom % of Ca and a second crystal group including crystal grains containing 0.4 or more atom % of Ca.

In the multilayer ceramic capacitor, the relationship of A/B≧1.003 is preferably satisfied where A represents the total content of Ba and Ca in moles and B represents the content of Ti in moles in the dielectric ceramic.

A method for producing a multilayer ceramic capacitor according to the present invention includes sintering a capacitor body which includes green sheets containing dielectric powders and inner electrode patterns alternately stacked.

The method includes preparing a first powder as a dielectric powder by coating the surface of a barium titanate powder, barium calcium titanate or a mixed powder thereof that has a mean particle diameter of 0.15 to 0.3 mm, with an oxide of one first rare earth element selected from holmium, yttrium, erbium, thulium, ytterbium and lutetium wherein the content of the first rare earth oxide is 0.6 to 2 molar parts with respect to 100 molar parts of the barium titanate powder, the barium calcium titanate or the mixed powder of a barium titanate powder and a barium calcium titanate powder; and adding 0.5 to 2 molar parts of a MgO powder, 0.2 to 0.5 molar parts of a $MnCO_3$ powder, and 0.1 to 1 molar parts of an oxide powder of one second rare earth element selected from samarium, europium, gadolinium, terbium and dysprosium, to 100 molar parts of the barium titanate powder, the barium calcium titanate powder or the mixed powder of a barium titanate powder and a barium calcium titanate powder.

In the method for producing multilayer ceramic capacitors according to the present invention, it is preferable to fire the formed capacitor body at a temperature of 1050° C. to 1150° C.

In the method for producing multilayer ceramic capacitors according to the present invention, the barium titanate powder is preferably represented by a chemical formula $Ba_{1-x}Ca_xTiO_3$ where x is 0.01 to 0.2.

In the method for producing multilayer ceramic capacitors according to the present invention, the relationship of $C/D \geq 1.003$ is preferably satisfied where C represents the total content of Ba and Ca in moles and D represents the content of Ti in moles in the $Ba_{1-x}Ca_xTiO_3$ powder where x is 0.01 to 0.2.

The first rare earth element and the second rare earth element are both represented by RE and an oxide of such a rare earth element is represented by $RE_2O_3$. This is based on the English description (Rare earth) of rare earth elements in the periodic table.

Effects of the Invention

According to the present invention, dielectric layers constituting a multilayer ceramic capacitor contain predetermined amounts of magnesium, manganese, and rare earth elements; and crystal grains mainly composed of barium titanate contain two rare earth elements having different ionic radii to satisfy the concentration gradients described above. As a result, even when the crystal grains constituting the dielectric layers have a mean crystal grain diameter of 0.15 to 0.3 μm, a high relative dielectric constant, a low temperature dependent variation of the relative dielectric constant and extended high temperature loading life can be achieved.

In the present invention, when crystal grains constituting a dielectric ceramic are composite grains containing both a first crystal group composed of crystal grains having a Ca component concentration of 0.2 atom % or less and a second crystal group composed of crystal grains having a Ca component concentration of 0.4 atom % or more, the relative dielectric constant of dielectric layers can be further increased and the temperature dependent variation of the relative dielectric constant can be further decreased.

In the present invention, when the relationship of $A/B \geq 1.003$ is satisfied where A represents the total content of Ba and Ca in moles in a dielectric ceramic and B represents the content of Ti in moles in the dielectric ceramic, grain growth of the crystal grains can be suppressed and hence the high temperature loading life can be further extended.

According to a method for producing a multilayer ceramic capacitor of the present invention, a dielectric powder is used for forming green sheets. Such a dielectric powder is obtained by preparing a first powder by coating the surface of a barium titanate powder, a barium calcium titanate powder, or a mixed powder of a barium titanate powder and a barium calcium titanate powder that has a mean particle diameter of 0.15 to 0.3 μm, with an oxide of one first rare earth element selected from holmium, yttrium, erbium, thulium, ytterbium, and lutetium; and adding an oxide powder of one second rare earth element selected from samarium, europium, gadolinium, terbium, and dysprosium, a MgO powder, and a $MnCO_3$ powder to the first powder. As a result, after firing of such a dielectric powder, crystal grains that have a mean diameter of 0.15 to 0.3 μm and a difference in concentration gradient between the first rare earth element and the second rare earth element can be easily formed in dielectric layers. Accordingly, a multilayer ceramic capacitor having a high relative dielectric constant, good temperature characteristic of the relative dielectric constant, and good high temperature loading life can be easily obtained.

In the present invention, by firing a formed capacitor body at a temperature of 1050° C. to 1150° C., a multilayer ceramic capacitor having a high relative dielectric constant, good temperature characteristic of the relative dielectric constant, and good high temperature loading life can be obtained.

In the present invention, when a $Ba_{1-x}Ca_xTiO_3$ powder (x=0.01 to 0.2) is used as the barium calcium titanate powder used for the first powder, a multilayer ceramic capacitor having a higher relative dielectric constant and good temperature characteristic of the relative dielectric constant can be easily obtained.

In the present invention, when a $Ba_{1-x}Ca_xTiO_3$ powder (x=0.01 to 0.2) is used as the barium calcium titanate powder used for the first powder, grain growth of crystal grains after firing can be suppressed with the $Ba_{1-x}Ca_xTiO_3$ powder (x=0.01 to 0.2) satisfying the relationship of $C/D \geq 1.003$ where C represents the total content of Ba and Ca in moles and D represents the content of Ti in moles. Thus, a multilayer ceramic capacitor having better high temperature loading life can be obtained.

PREFERRED EMBODIMENTS FOR CARRYING OUT THE INVENTION

Multilayer Ceramic Capacitor

Figure 1:
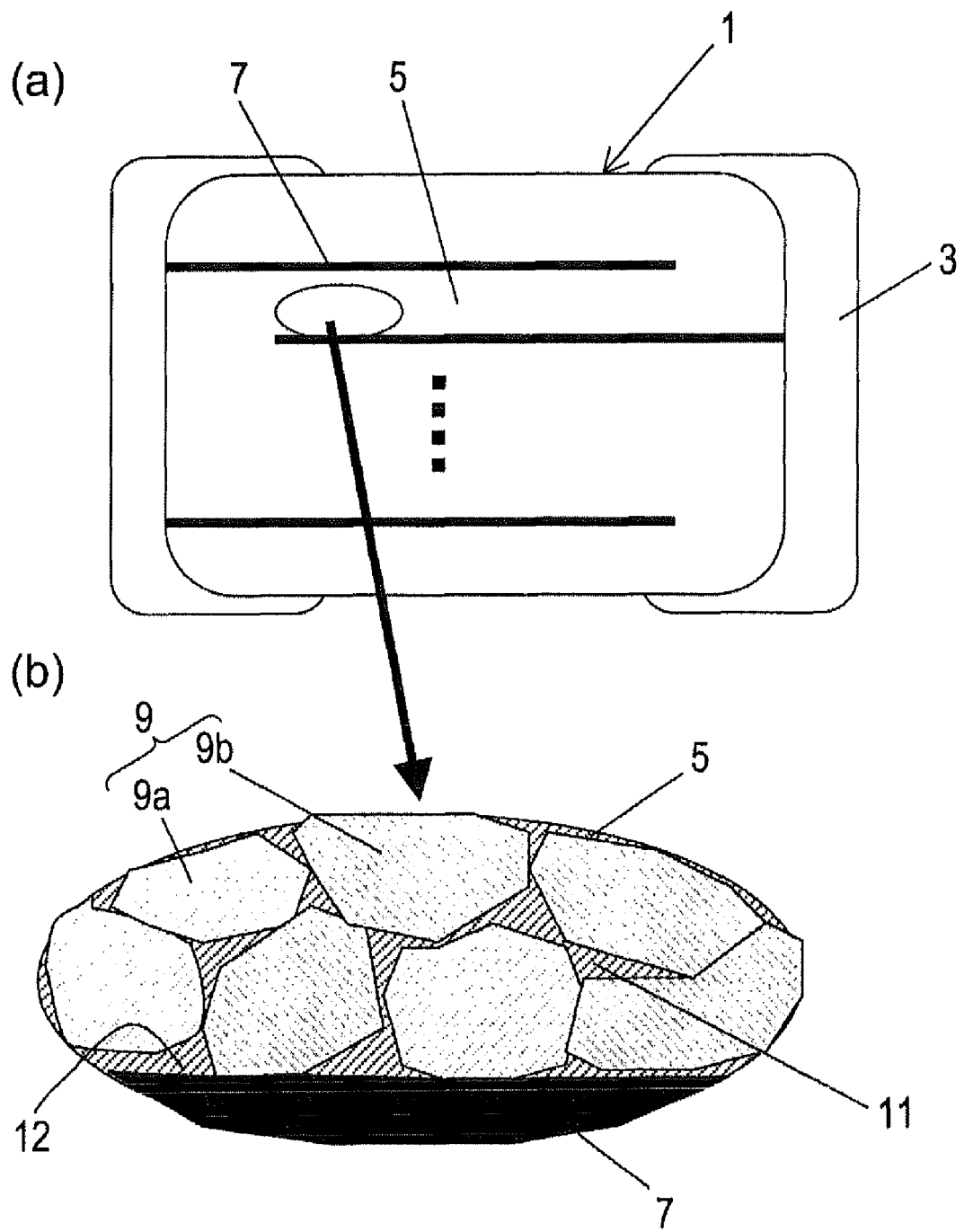
FIG. 1(a) is a schematic cross-sectional view illustrating a multilayer ceramic capacitor of the present invention and FIG. 1(b) is an extracted and enlarged view illustrating crystal grains and grain boundaries constituting a dielectric ceramic layer.

A multilayer ceramic capacitor according to the present invention is described in detail on the basis of schematic sectional views of FIGS. 1(a) and 1(b). FIG. 1(a) is a schematic cross-sectional view illustrating a multilayer ceramic capacitor of the present invention. An enlarged view of FIG. 1(b) in terms of the marked portion is a schematic view showing crystal grains and grain boundaries constituting a dielectric ceramic that serves as a dielectric layer.

In the multilayer ceramic capacitor according to the present invention, the external electrodes 3 are formed at both ends of a capacitor body 1. These external electrodes 3 are formed by, for example, firing an alloy paste containing Cu or Cu and Ni. The capacitor body 1 includes dielectric layers 5 and internal electrode layers 7 disposed alternately. The dielectric layers 5 are constituted by crystal grains 9 mainly composed of barium titanate and grain boundaries 11. The dielectric layers 5 have a thickness of 2 µm or less and, particularly preferably, 1.5 µm or less. The dielectric layers 5 also preferably have a thickness of 0.5 µm or more for maintaining high insulation property for each dielectric layer 5. Accordingly, a multilayer ceramic capacitor having a reduced size and a high capacitance can be obtained.

The internal electrode layers 7 are desirably formed of a base metal such as Ni or a Ni alloy because a large number of the layers can be stacked at a reduced production cost. In particular, Ni is more desirable since the internal electrode layers 7 and the dielectric layers 5 can be fired simultaneously.

In a multilayer ceramic capacitor according to the present invention, the crystal grains 9 that constitute a dielectric ceramic serving as the dielectric layers 5 are mainly composed of barium titanate and have a mean grain diameter of 0.15 to 0.3 µm. As for the composition of the dielectric ceramic serving as the dielectric layers 5, the content of magnesium is 0.5 to 2 molar parts based on MgO, the content of manganese is 0.2 to 0.5 molar parts based on MnO, and the total content of one first rare earth element (RE) selected from holmium, yttrium, erbium, thulium, ytterbium, and lutetium and one second rare earth element (RE) selected from samarium, europium, gadolinium, terbium, and dysprosium is 0.7 to 3 molar parts based on $RE_2O_3$, with respect to 100 molar parts of barium titanate. The crystal grains 9 contain one first rare earth element selected from holmium, yttrium, erbium, thulium, ytterbium, and lutetium in a larger amount than one second rare earth element selected from samarium, europium, gadolinium, terbium, and dysprosium. The concentration gradient of the first rare earth element from the grain boundary to the center portion in a crystal grain is −0.005 atom %/nm or more and −0.05 atom %/nm or less. The concentration gradient of the second rare earth element from the grain boundary to the center portion in a crystal grain is −0.0005 atom %/nm or more and −0.005 atom %/nm or less.

Consequently, even when the crystal grains 9 have a mean diameter of 0.15 to 0.3 µm, a relative dielectric constant of 1760 or more can be achieved, the temperature dependent variation of the relative dielectric constant at 85° C. based on the relative dielectric constant at 25° C. can be made equal to or larger than −15.9%, and a rate of decrease of grain-boundary resistance in a high temperature loading test can be made 1.09%/min or less. Thus, a multilayer ceramic capacitor can be obtained that has a high relative dielectric constant regardless of fine grains, has a stable temperature characteristic of the relative dielectric constant, and has good high temperature loading life. When a rate of decrease of grain-boundary resistance in a high temperature loading test is 1.1%/min or less in the present invention, a high temperature loading life of 1000 hours or more can be achieved under a condition described below (temperature: 85° C., applied voltage: 6.3 V/µm). Thus, the high temperature loading life can be extended.

The dielectric layers 5 constituting a multilayer ceramic capacitor according to the present invention are composed of the crystal grains 9 mainly composed of barium titanate. In this case, the crystal grains 9 are preferably composed of a composite oxide having a perovskite structure and represented by a chemical formula of $BaTiO_3$ because such a composite oxide has a high relative dielectric constant. Alternatively, the crystal grains 9 may include crystal grains 9a containing dissolved Ca represented by $Ba_{1-x}Ca_xTiO_3$ as well as crystal grains 9b represented by $BaTiO_3$. In particular, the crystal grains 9 are preferably composite grains containing both a first crystal group composed of the crystal grains 9b having a Ca component concentration of 0.2 atom % or less and a second crystal group composed of the crystal grains 9a having a Ca component concentration of 0.4 atom % or more. Accordingly, a relative dielectric constant can be increased and the temperature dependent variation of a capacitance can be decreased.

The crystal grains 9a that constitute the second crystal group preferably have a Ca component concentration of 0.4 atom % or more, and in particular 0.5 to 2.5 atom %, in terms of maintaining the perovskite structure of the crystal grains 9a.

It is preferred that b/(a+b) be 0.7 to 0.8 in the present invention where a represents the area of the crystal grains 9b of the first crystal group and b represents the area of the crystal grains 9a of the second crystal group in a surface of the dielectric layers 5 obtained by polishing. When the proportion of the area of the crystal grains 9a of the second crystal group b/(a+b) is 0.7 or more, relative dielectric constant of the dielectric layers 5 is increased while a rate of decrease of grain-boundary resistance can be reduced and hence high temperature loading life can be extended when b/(a+b) is 0.8 or less. This is advantageous.

The Ca concentration of the crystal grains 9 is determined as follows. About thirty crystal grains 9 present in a polished surface obtained by polishing a section of the dielectric layers 5 constituting a multilayer ceramic capacitor are subjected to elemental analysis with a transmission electron microscope equipped with an elemental analysis device. In this case, the spot size of electron beams is 5 nm. The analysis is conducted at four to five points that are on a straight line drawn from near the grain boundary to the center of each crystal grain 9 and are spaced apart from each other at substantially equal intervals. An average value of measurement values at these points is determined as the Ca concentration. In this case, the Ca concentration is determined with respect to the total amount, or 100%, of Ba, Ti, Ca, Mg, rare earth elements, and Mn determined at each measurement point of the crystal grain.

The crystal grains 9 are selected in the following manner. The areas of crystal grains are measured by image processing on the basis of the contours of the grains. The diameters of the grains are calculated as the diameters of circles having the same areas as the grains. Crystal grains that have diameters within the range of ±30% from the mean crystal grain diameter obtained by a method described below are selected as the crystal grains 9.

The centers of the crystal grains 9 are defined as the centers of the inscribed circles of the crystal grains 9. "Near grain boundary of the crystal grain" refers to a region within 5 nm inward from the grain boundary of the crystal grain 9. An image projected in a transmission electron microscope is input into a computer and the inscribed circles of the crystal grains 9 are drawn on the image on the screen of the computer. Thus, the centers of the crystal grains are determined.

The proportion of the area of the crystal grains 9b of the first crystal group and the proportion of the area of the crystal grains 9a of the second crystal group are calculated from data of area obtained when the Ca concentration described above is determined. In this case, crystal grains having a Ca concentration of 0.2 atom % or less are categorized as the crystal grains 9b of the first crystal group and crystal grains having a Ca concentration of 0.4 atom % or more are categorized as the crystal grains 9a of the second crystal group.

When the crystal grains 9 are composite grains containing both the first crystal group composed of the crystal grains 9b having a Ca component concentration of 0.2 atom % or less and the second crystal group composed of the crystal grains 9a having a Ca component concentration of 0.4 atom % or more, the relationship of $A/B \geqq 1.003$ is preferably satisfied in the present invention where A represents the total content of Ba and Ca in moles in a dielectric ceramic and B represents the content of Ti in moles in the dielectric ceramic. Consequently, a higher relative dielectric constant can be achieved and a temperature characteristic of the dielectric constant can be stabilized. Also, high temperature loading life can be further extended.

It is important in the present invention that the mean diameter of the crystal grains 9 is 0.15 to 0.3 μm. In particular, this mean diameter is desirably 0.165 to 0.28 μm, and more desirably 0.165 to 0.193 μm. Consequently, a high capacitance and a high insulation property can be achieved even when the thickness of the dielectric layers 5 is decreased.

That is, when the crystal grains 9 have a mean diameter of less than 0.15 μm, the dielectric layers 5 have a relative dielectric constant of less than 1760. On the other hand, when the crystal grains 9 have a mean diameter of more than 0.3 μm, relative dielectric constant of the dielectric layers 5 is increased, whereas the temperature dependent variation of the relative dielectric constant is less than −15.9% and the high temperature loading life is decreased.

The mean diameter of the whole crystal grains 9 composed of the crystal grains 9b constituting the first crystal group and the crystal grains 9a constituting the second crystal group is determined as follows. An image of a polished surface obtained by polishing a section of the dielectric layers 5 is projected in a transmission electron microscope, and is input into a computer. A diagonal line is drawn on the image on the screen of the computer and the areas of crystal grains on the diagonal line are measured by image processing on the basis of the contours of the grains. The diameters of the grains are calculated as the diameters of circles having the same areas as the grains. The mean diameter is obtained as a mean value of the resultant diameters of about 50 crystal grains.

The mean diameter of the crystal grains 9b constituting the first crystal group and the mean diameter of the crystal grains 9a constituting the second crystal group, the first crystal group and the second crystal group constituting the dielectric layers 5, are calculated from the area data of the crystal grains 9b constituting the first crystal group and the crystal grains 9a constituting the second crystal group, the area data being obtained when the Ca concentration described above is determined. In this case, an image of a surface obtained by polishing a section of the dielectric layers 5, the image being projected in a transmission electron microscope, is input into a computer. The contours of the crystal grains 9 on the screen of the computer are subjected to image processing and the areas of the crystal grains are measured. The diameters of the grains are calculated as the diameters of circles having the same areas as the grains. The mean diameter is obtained as a mean value of the resultant diameters of about 50 crystal grains.

Figure 2:
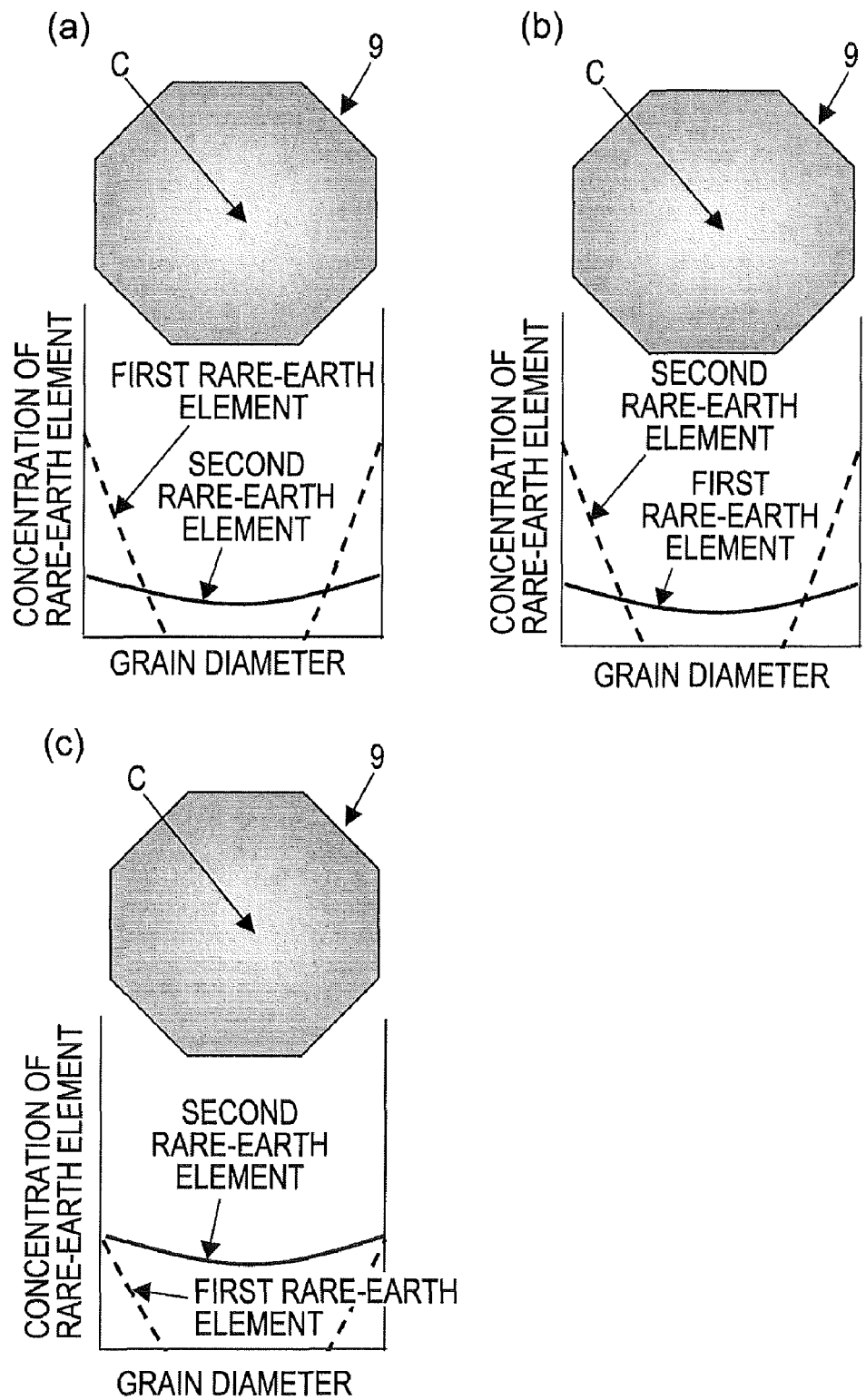
FIG. 2(a) schematically illustrates the concentration gradients of the first rare earth element and the second rare earth element in a crystal grain constituting the dielectric layers of a multilayer ceramic capacitor according to the present invention, FIG. 2(b) schematically illustrates a crystal grain in which the concentration gradient of the first rare earth element is smaller than the concentration gradient of the second rare earth element, and the concentration gradients of the rare earth element. This crystal grain in FIG. 2(b) does not fall within the scope of the present invention
FIG. 2(c) illustrates a crystal grain in which the content of the second rare earth element is larger than that of the first rare earth element and the concentration gradients of these rare earth elements.

FIG. 2(*a*) schematically illustrates the concentration gradients of the first rare earth element and the second rare earth element in a crystal grain constituting the dielectric layers of a multilayer ceramic capacitor according to the present invention. FIG. 2(*b*) schematically illustrates a crystal grain in which the concentration gradient of the first rare earth element is smaller than the concentration gradient of the second rare earth element and the concentration gradients of these rare earth elements. This crystal grain in FIG. 2(*b*) does not fall within the scope of the present invention. FIG. 2(*c*) schematically illustrates a crystal grain in which the content of the second rare earth element is larger than that of the first rare earth element and the concentration gradients of these rare earth elements.

Herein, the concentration gradients of the first rare earth element and the second rare earth element from the grain boundary to the center portion of a crystal grain are determined with a transmission electron microscope equipped with an elemental analysis device (EDS). In this case, a sample to be analyzed is obtained by polishing a multilayer ceramic capacitor in the lamination direction and selecting the crystal grains 9 on the polished surface of the dielectric layers 5. When the crystal grains 9 are composite grains containing both the first crystal group composed of the crystal grains having a Ca component concentration of 0.2 atom % or less and the second crystal group composed of the crystal grains having a Ca component concentration of 0.4 atom % or more, the crystal grains 9b of the first crystal group and the crystal grains 9a of the second crystal group are selected in accordance with the determination based on the measurement of the Ca concentration described above.

The crystal grains 9 (or the crystal grains 9a and 9b) are selected in the following manner. The areas of crystal grains are measured by image processing on the basis of the contours of the grains. The diameters of the grains are calculated as the diameters of circles having the same areas as the grains. Crystal grains that have diameters within the range of ±30% from the mean diameter of the crystal grains 9 (or the crystal grains 9a and 9b) are selected. The mean diameter is obtained by the measurement method described above. Ten crystal grains in this range are respectively selected in terms of the crystal grains 9b of the first crystal group and the crystal grains 9a of the second crystal group.

The spot size of electron beams in elemental analysis is 1 to 3 nm. The analysis is conducted at points that are on a straight line drawn from the grain boundary to the center portion of each crystal grain 9 and are spaced apart from each other at an interval of 5 nm. This measurement is conducted unidirectionally in each crystal grain 9. The grain boundary of a crystal grain is defined as a region within 3 nm from the surface of the crystal grain. The center portions of crystal grains are defined as the centers of the inscribed circles of the crystal grains. In this case, the inscribed circles of the crystal grains are drawn on an image projected from a transmission electron microscope on the screen of a computer. On the basis of the image on the screen, the center portions of the crystal grains are determined.

In this way, each crystal grain 9 is analyzed from its grain boundary to its center portion and the concentration of the first rare earth element and the concentration of the second rare earth element are determined with respect to the total amount, which is set to 100%, of Ba, Ti, Ca, Mg, rare earth elements, and Mn determined at each measurement point. Subsequently, the concentrations of the first rare earth element and the second rare earth element determined at each measurement point of the crystal grains 9 are plotted on a graph against the distance of the measurement points from the grain boundary to the center portion. (The X-axis indicates the distance from the grain boundary to the center portion and the Y-axis indicates the concentrations of the first rare earth element and the second rare earth element.) The concentration gradients of the first rare earth element and the second rare earth element are determined by a least square method on the basis of the plotted points.

The concentration gradients of the first rare earth element and the second rare earth element in the present invention are represented by, for example, in FIG. 2(a) described above, changes in concentrations of the rare earth elements in the distance from the interface to the center portion C of the crystal grain 9 when the X-axis represents the grain diameter of the crystal grain 9.

In the present invention, it is important that the crystal grains 9 constituting the dielectric layers 5 in a multilayer ceramic capacitor contain one first rare earth element and one second rare earth element such that the content of the first rare earth element is larger than that of the second rare earth element; the one first rare earth element is selected from holmium (Ho), yttrium (Y), erbium (Er), thulium (Tm), ytterbium (Yb), and lutetium (Lu), which have ionic radii equal to or less than 0.106 nm; and the one second rare earth element is selected from samarium (Sm), europium (Eu), gadolinium (Gd), terbium (Tb), and dysprosium (Dy), which have ionic radii equal to or more than 0.107 nm. Herein, "the content of the first rare earth element is larger than that of the second rare earth element" refers to the case where the concentration of the first rare earth element is higher than that of the second rare earth element on the surfaces of the crystal grains 9.

As described above, in the present invention, the crystal grains 9 contain the first rare earth element and the second rare earth element such that the concentration of the first rare earth element is higher than that of the second rare earth element. As a result, a decrease in the relative dielectric constant caused by an excessive content of the second rare earth element in the crystal grains 9 and degradation of the insulation property caused by an insufficient content of the first rare earth element in the crystal grains 9 can be suppressed.

Among the rare earth elements having different ionic radii described above, it is preferred that one element is selected as the first rare earth element from Ho, Y, Er, and Tm; one element is selected as the second rare earth element from Sm, Eu, Gd, Tb, and Dy; and these selected elements are used in combination. As a result, the relative dielectric constant of the dielectric layers 5 is increased and the high temperature loading life of the dielectric layers 5 can be extended. In particular, the combination of Y having an ionic radius of 0.106 nm and Ho having an ionic radius of 0.105 nm and the combination of Tb having an ionic radius of 0.109 nm and Gd having an ionic radius of 0.11 nm are more preferable.

In the present invention, it is important that the concentration gradient of the first rare earth element from the grain boundary 11 to the center portion C of each crystal grain 9a and 9b is −0.005 atom %/nm or more and −0.05 atom %/nm or less; and the concentration gradient of the second rare earth element from the grain boundary 11 to the center portion C of each crystal grain 9a and 9b is 0.0005 atom %/nm or more and −0.005 atom %/nm or less.

In other words, each crystal grain 9a and 9b constituting the dielectric layers 5 in the present invention contains the two rare earth elements such that the first rare earth element has a steep concentration gradient from the grain boundary 11 to the center portion C of each crystal grain 9a and 9b whereas the second rare earth element has a gentle concentration gradient from the grain boundary 11 to the center portion C of each crystal grain 9a and 9b.

That is, in the present invention, the first rare earth element contained in each crystal grain 9a and 9b in a high concentration is localized near the grain boundary 11 to have a low concentration in the inner portion of each crystal grain 9a and 9b. As a result, the insulation property of each crystal grain 9a and 9b near the grain boundary 11 can be enhanced while the tetragonal system can be maintained in the inner portion of each crystal grain 9a and 9b. Thus, a high relative dielectric constant can be achieved.

Also, each crystal grain 9a and 9b contains the second rare earth element in a low concentration, and hence, the density of carriers such as oxygen holes can be decreased in each crystal grain 9a and 9b. Thus, a high insulation property can be obtained and, as a result, high temperature loading life can be extended.

In contrast, when crystal grains contain only the first rare earth element or only the second rare earth element, a rate of decrease in resistance of grain boundary 11 is large and high temperature loading life is decreased. When rare earth elements other than the first rare earth elements and the second rare earth elements described above are used, the concentration gradient of the first rare earth element from the grain boundary 11 to the center portion C of each crystal grain 9a and 9b mainly composed of barium titanate cannot be made within the range of −0.005 atom %/nm or more and −0.05 atom %/nm or less, and the concentration gradient of the second rare earth element from the grain boundary 11 to the center portion C of each crystal grain 9a and 9b mainly composed of barium titanate cannot be made within the range of −0.0005 atom %/nm or more and −0.005 atom %/nm or less. As a result, high temperature loading life is decreased.

The relative dielectric constant is considerably decreased when, in each crystal grain 9a and 9b, the total content of the first rare earth element and the second rare earth element is large, and the concentration gradient of the first rare earth element from the grain boundary 11 to the center portion C in each crystal grain 9a and 9b is more than −0.05 atom %/nm, or the concentration gradient of the second rare earth element from the grain boundary 11 to the center portion C in each crystal grain 9a and 9b is more than −0.005 atom %/nm.

Temperature dependent variation of the relative dielectric constant is increased and high temperature loading life is decreased when the content of the first rare earth element and the second rare earth element is small in each crystal grain 9a and 9b, and the concentration gradient of the first rare earth element from the grain boundary 11 to the center portion C in each crystal grain 9a and 9b is less than −0.005 atom %/nm, or the concentration gradient of the second rare earth element from the grain boundary 11 to the center portion C in each crystal grain 9a and 9b is less than −0.0005 atom %/nm.

It is important that the total content of the first rare earth element and the second rare earth element in the present invention is 0.7 to 3 molar parts with respect to 100 molar parts of barium titanate. In particular, when the content of the first rare earth element and the second rare earth element is in this range, the relative dielectric constant can be increased and temperature dependent variation of the relative dielectric constant can be decreased and high temperature loading life can be extended. In particular, the content of the first rare earth element is preferably 0.6 to 2 molar parts with respect to 100 molar parts of barium titanate. The content of the second rare earth element is preferably 0.1 to 1 molar part with respect to 100 molar parts of barium titanate.

It is important in the present invention that a dielectric ceramic serving as the dielectric layers 5 contains magnesium and manganese in addition to the rare earth elements; the content of magnesium is 0.5 to 2 molar parts based on MgO with respect to 100 molar parts of barium titanate; and the content of manganese is 0.2 to 0.5 molar parts based on MnO with respect to 100 molar parts of barium titanate. As a result, the resistance to reduction of the dielectric layers 5 can be enhanced, the temperature characteristic of the relative dielectric constant can be stabilized and the insulation property can be enhanced. Thus, the dielectric layers 5 have good high temperature loading life.

In contrast, when the content of magnesium in a dielectric ceramic serving as the dielectric layers 5 is less than 0.5 molar parts based on MgO with respect to 100 molar parts of barium titanate, the temperature dependent variation of the relative dielectric constant at 85° C. based on the relative dielectric constant at 25° C. is increased to −18.2% and a rate of decrease of grain-boundary resistance is increased to 1.2%/min. Thus, the high temperature loading life characteristic is degraded. When the content of magnesium is more than 2 molar parts based on MgO with respect to 100 molar parts of barium titanate, the relative dielectric constant is decreased to 1700.

When the content of manganese in a dielectric ceramic serving as the dielectric layers 5 is less than 0.2 molar parts based on MnO with respect to 100 molar parts of barium titanate, a rate of decrease of grain-boundary resistance is increased to 3.3%/min and the high temperature loading life is considerably decreased.

When the content of manganese is more than 0.5 molar parts based on MnO with respect to 100 molar parts of barium titanate, the relative dielectric constant is decreased to 1720.

Figure 3:
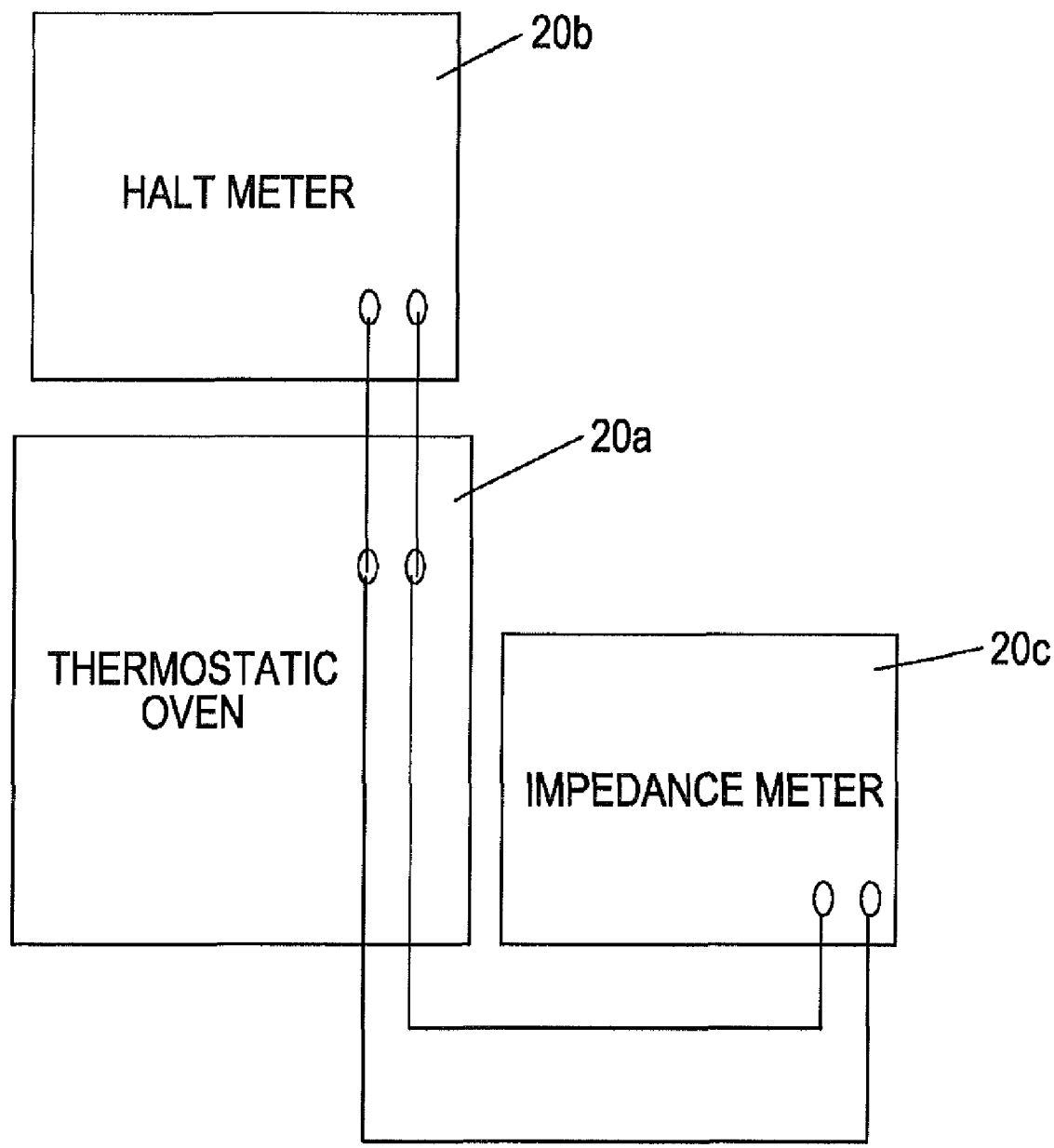
FIG. 3 is a schematic diagram showing the process of evaluating the resistance of the grain boundaries in the ceramic dielectric layer by using an AC impedance method.

FIG. 3 is a schematic diagram showing the process of evaluating the resistance of the grain boundaries in the ceramic dielectric layer by using an AC impedance method. This evaluation can evaluate high temperature loading life time for multilayer ceramic capacitors with the simple way and requires a short evaluation time for high temperature loading life time compared to an ordinary life test. Referring to FIG. 3, a sample of a multilayer ceramic capacitor is mounted in a thermostatic oven 20a where the temperature is controlled and a DC voltage is applied to the sample in a Highly Accelerated Life Test (HALT) meter 20b. The impedance is measured with an impedance meter 20c having an AC power supply.

Figure 4:
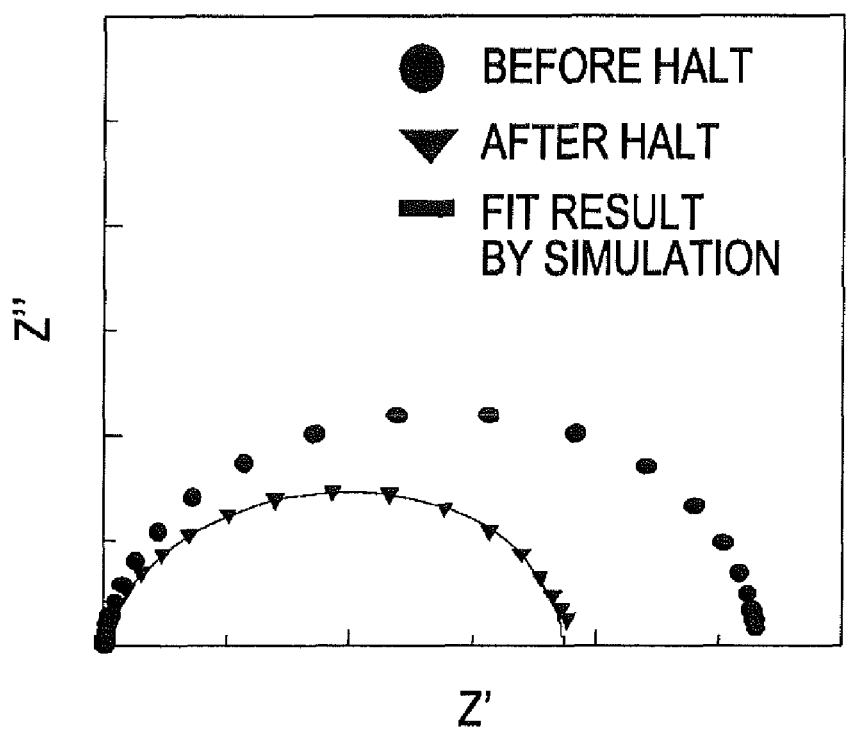
FIG. 4(a) is a graph (Cole-Cole plot) showing the impedance change at the crystal grains (core (central portion) and shell (peripheral portion)), the grain boundaries, and the interfaces between the internal electrode layers and the ceramic dielectric layers of the multilayer ceramic capacitor
FIG. 4(b) is an equivalent circuit showing each component of crystal grains, grain boundaries and the interfaces between the internal electrode layers and the ceramic dielectric layers.
Figure 4:
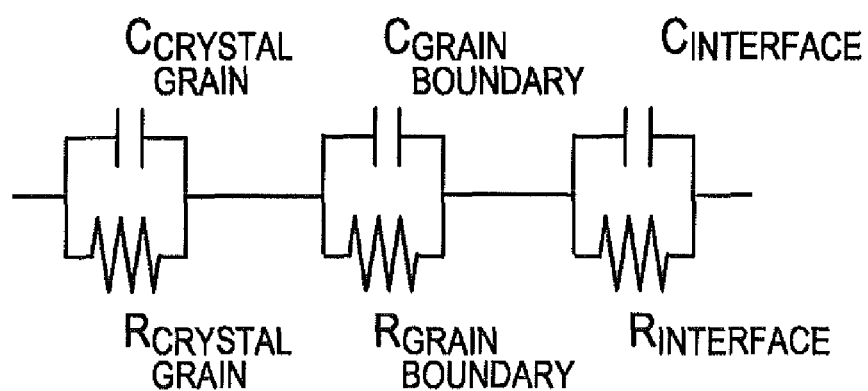

FIG. 4(a) is a graph (Cole-Cole plot) showing the impedance change at crystal grains 9 (core (central portion) and shell (peripheral portion)), the grain boundaries 11, and the interface 12 between the internal electrode layers 7 and the ceramic dielectric layers 5. FIG. 4(b) is an equivalent circuit showing each component of crystal grains 9, grain boundaries 11 and the interface 12 between the internal electrode layers 7 and the ceramic dielectric layers 5.

In this evaluation, as shown by an equivalent circuit in FIG. 4(b), the ceramic dielectric layer 5 is divided into three components: the crystal grain 9, the grain boundary 11, and the interface 12 between the internal electrode layer 7 and the ceramic dielectric layer 5. The horizontal axis of the graph indicates the real part of the impedance signal and the vertical axis of the graph indicates the imaginary part of the impedance signal. The graph showing the change in impedance shows the difference between before and after HALT under a high temperature load and the fitting through simulation. In this evaluation, the change in resistance of the crystal grain boundaries 11 is focused. This above-mentioned evaluation can be done with using impedance analysis software by dividing the Cole-Cole plot in FIG. 4(a) before and after HALT into the three components: the crystal grain 9, the grain boundary 11, and the interface 12 between the internal electrode layer 7 and the ceramic dielectric layer 5.

In the present invention, the HALT was conducted under a variable retention time at a temperature preferably higher than the Curie temperature of the crystal grains 9 constituting dielectric ceramics of dielectric layer 5 and a voltage preferably ⅓ or more of the rated voltage of the multilayer ceramic capacitor. Then, change in resistance of the grain boundary 11 in the dielectric layers 5 is measured by conducting measurements in terms of AC impedance under the same conditions before and after the samples are left under the high temperature loading conditions described above. The resistance change is evaluated in terms of time dependence (variation per unit of time) by evaluating samples that have been left for different periods of time. Here, the rate of change in the real part is preferably 1%/min or less.

In this case, the temperature is preferably 1.5 times or more the Curie temperature and the voltage is preferably ⅖ or more of rated voltage because diffusion of ions and mobility of electrons in the dielectric layers 5 are enhanced before and after the high temperature loading treatment and the change in resistance of the grain boundary 11 can be clearly observed.

A dielectric ceramic constituting the dielectric layers 5 constituting a multilayer ceramic capacitor according to the present invention may contain a component in the range of 2 mass % or less other than barium titanate, magnesium, rare earth elements, and manganese. For example, the presence of a glass component mainly composed of $SiO_2$ advantageously enhances the sinterability of a dielectric ceramic serving as the dielectric layers 5 without degrading the characteristics of the dielectric ceramic.

<Method for Producing the Multilayer Ceramic Capacitor>

Figure 5:
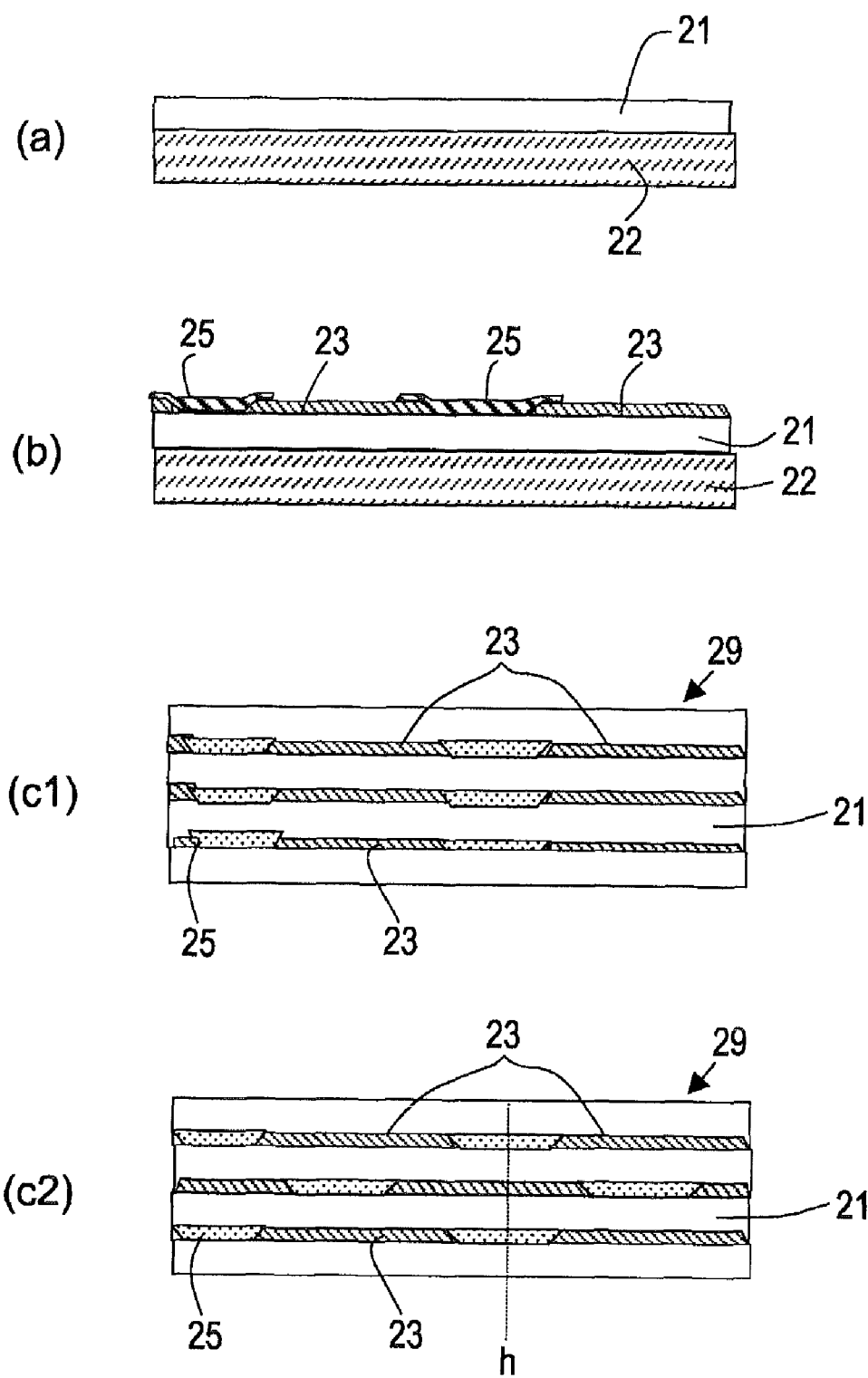
FIG. 5 is a diagram illustrating the procedure of making the multilayer ceramic capacitors.

Next, a method for producing the multilayer ceramic capacitor according to the present invention is described. FIG. 5 is a diagram illustrating the procedure of making the multilayer ceramic capacitors.

Step (a)

In the method of the present invention, first, a dielectric powder is mixed with an organic resin such as a polyvinyl butyral and solvents such as toluene and alcohol in, for example, a ball mill to prepare a ceramic slurry. Ceramic green sheets 21 are formed on a base part 22 from the ceramic slurry by a sheet-forming method such as a doctor blade method or a die-coating method. The thickness of each of the ceramic green sheets 21 is preferably 1 to 3 μm to pursue thickness reduction for increasing the capacitance of the ceramic dielectric layer 5 and to maintain the high insulating property.

Dielectric powder used in the method for producing a multilayer ceramic capacitor according to the present invention is a BT powder represented by $BaTiO_3$ as a barium titanate powder, a BCT powder represented by a $Ba_{1-x}Ca_x$-

TiO$_3$ powder (x=0.01 to 0.2, BCT powder) in which a part of Ba is replaced by Ca as a barium calcium titanate powder, or a mixed powder of the BT powder and the BCT powder.

In particular, the BCT powder, which contains Ba, Ca, and Ti, preferably has a molar ratio C/D of 1.003 or more, in particular, 1.003 to 1.007, where C represents the total content of Ba and Ca in moles and D represents the content of Ti in moles. When the molar ratio C/D in terms of Ba and Ca and Ti constituting a BCT powder is 1.003 or more, grain growth of the crystal grains 9a constituting the second crystal group can be suppressed and hence high insulation property is achieved and high temperature loading life can be extended. When the ratio C/D is 1.007 or less, crystal grains mainly composed of barium titanate can maintain a ferroelectric crystal structure of the perovskite type and a high relative dielectric constant can be achieved.

BT powders and BCT powders can be obtained by mixing compounds including a Ba component, a Ca component and a Ti component so as to match the predetermined composition. For example, these powders can be obtained by a method selected from a solid-phase method, a liquid phase method including a method using the oxalate process, and the hydrothermal synthetic process, Among these methods, the hydrothermal synthetic method is preferable because the obtained dielectric powders show a narrow particle size distribution and high crystallinity.

It is important that a BT powder and a BCT powder used in a method for producing a multilayer ceramic capacitor according to the present invention has a mean particle diameter of 0.15 to 0.3 μm. Consequently, the thickness of the dielectric layers 5 can be easily reduced and such a BT powder and a BCT powder can have a high relative dielectric constant.

When a BT powder and a BCT powder have a mean particle diameter of less than 0.15 μm, the relative dielectric constant is decreased and the temperature dependent variation of the relative dielectric constant at 85° C. based on the relative dielectric constant at 25° C. is increased. When a BT powder and a BCT powder have a mean particle diameter of more than 0.15 μm, the rate of decrease in resistance at grain boundaries is increased and high temperature loading life is decreased.

Next, in the present invention, a plurality of rare earth elements are dissolved, as an additive for enhancing the resistance to reduction and the dielectric characteristics of a dielectric ceramic, in a BT powder, a BCT powder, or a mixed powder of a BT powder and a BCT powder.

The total amount of rare earth elements dissolved in a BT powder, a BCT powder, or a mixed powder of a BT powder and a BCT powder is 0.7 to 3 molar parts with respect to 100 molar parts of the BT powder, the BCT powder, or the mixed powder thereof. In this case, a first powder is prepared by coating the surface of a BT powder, a BCT powder, or a mixed powder of a BT powder and a BCT powder with an oxide of one first rare earth element selected from holmium, yttrium, erbium, thulium, ytterbium, and lutetium, which have ionic radii equal to or less than 0.106 nm. The coating amount of the oxide is 0.6 to 2 molar parts with respect to 100 molar parts of a BT powder, a BCT powder, or a mixed powder of a BT powder and a BCT powder.

Subsequently, an oxide powder of one second rare earth element selected from samarium, europium, gadolinium, terbium, and dysprosium is added to the first powder, which is a BT powder, a BCT powder, or a mixed powder of a BT powder and a BCT powder that is coated with a predetermined amount of the first rare earth element. The amount of the oxide powder to be added is 0.1 to 1 molar part with respect to 100 molar parts of the first powder.

When an oxide powder of the second rare earth element is added, 0.5 to 2 molar parts of a MgO powder and 0.2 to 0.5 molar parts of a MnCO$_3$ powder are also added with respect to 100 molar parts of a BT powder, a BCT powder, or a mixed powder of a BT powder and a BCT powder, and mixed with the first powder. A MnCO$_3$ powder is preferable because a MnCO$_3$ powder is composed of fine particles and has high purity.

Such an oxide of magnesium, an oxide of a rare earth element, and an oxide of manganese dissolve in the crystal grains 9b constituting the first crystal group and the crystal grains 9a constituting the second crystal group. In this case, a portion of these oxides tend to be present in the grain boundary 11 and also function as sintering additives.

As described above, the present invention employs a method in which the surface of a BT powder, a BCT powder, or a mixed powder of a BT powder and a BCT powder is coated with an oxide of one first rare earth element selected from holmium, yttrium, erbium, thulium, ytterbium, and lutetium and subsequently an oxide powder of one second rare earth element selected from samarium, europium, gadolinium, terbium, and dysprosium is added to the coated powder. This method can suppress dissolution of the second rare earth element in a BT powder, a BCT powder, or a mixed powder of a BT powder and a BCT powder. As a result, the crystal grains 9 constituting the dielectric layers 5 which are a sintered product after firing, can have a concentration gradient of the first rare earth element in the range of −0.005 to −0.05 atom %/nm and a concentration gradient of the second rare earth element in the range of −0.0005 to −0.005 atom %/nm, from the grain boundary 11 to the center portion C.

In contrast, when an oxide of the first rare earth element and an oxide of the second rare earth element are added in one portion to a BT powder, a BCT powder, or a mixed powder of a BT powder and a BCT powder, the concentration gradient of the first rare earth element in crystal grains obtained by firing the BT powder, the BCT powder, or the mixed powder thereof is less than −0.005 atom %/nm. As a result, the temperature dependent variation of the relative dielectric constant at 85° C. is increased to −18.4% and the rate of decrease of grain-boundary resistance is 1.21%/min or more. Thus, the high temperature loading life is decreased.

In the present invention, a glass component may be added as an agent for enhancing a sinterability as long as a desired dielectric characteristic can be maintained in addition to components such as magnesium, the first rare earth element, the second rare earth element, and manganese. In this case, the amount of such a sintering agent to be added is preferably 0.5 to 2 parts by mass with respect to 100 parts by mass of a dielectric powder that is a mixture of a BCT powder and a BT powder. Consequently, the sinterability of a dielectric ceramic can be further improved. A preferred composition of the dielectric ceramic is Li$_2$O=1 to 15 mol %, SiO$_2$=40 to 60 mol %, BaO=15 to 35 mol %, and CaO=5 to 25 mol %. A glass powder used as a sintering agent preferably has a mean particle diameter in the range of 0.1 to 0.3 μm because such a glass powder exhibits enhanced dispersibility when added to a dielectric powder.

Step (b)

Next, a rectangular internal electrode pattern 23 is formed by printing on a main surface of each green sheet 21 prepared. A conductor paste from which the internal electrode pattern 23 is formed is prepared by mixing a Ni or Ni alloy as the main component metal with a ceramic powder as a common material, an organic binder, a solvent, and a dispersant. BT powder is preferably used as the ceramic power. A column-shaped ceramic is formed such that a ceramic powder in a conductive paste vertically connects the dielectric layers 5 through the internal electrode layers 7. As a result, separation between the dielectric layers 5 and the internal electrode layers 7 can be prevented. The thickness of the internal electrode pattern 23 is preferably 1 μm or less to reduce the size of the multilayer ceramic capacitor and to decrease the step difference generated by the internal electrode pattern 33.

It is also preferable according to the present invention to form a ceramic pattern 25 having substantially the same thickness as the internal electrode pattern 23 around the internal electrode pattern 23 to eliminate any step difference generated by the internal electrode pattern 23 on the ceramic green sheet 21. The ceramic component constituting the ceramic pattern 25 preferably contains the same dielectric powder used in the ceramic green sheet 21 so that the same degree of firing shrinkage is obtained during simultaneous firing.

Step (c)

Next, An adequate number of ceramic green sheets 21 with the internal electrode patterns 23 thereon are stacked, and a plurality of the ceramic green sheets 21 not provided with the internal electrode patterns 23 is stacked on the top and the bottom of the stack so that the same number of ceramic green sheets 21 without internal electrode patterns 23 are formed at the top and the bottom. As a result, a preliminary laminated body is formed. The internal electrode patterns 23 in the preliminary laminated body are displaced from one another, typically by a distance corresponding to half the pattern length in the longitudinal direction. By this arrangement, the internal electrode patterns 23 appear in the end faces of the laminated body in an alternating fashion after cutting.

In the method of producing multilayer ceramic capacitors according to the present invention, instead of by employing the above-described process of stacking the ceramic green sheets 21 with the internal electrode patterns 23 on their main surfaces prepared in advance, the preliminary laminated body can be formed by attaching a ceramic green sheet 21 on a substrate at the lower side of the ceramic green sheet, printing the internal electrode pattern 23 on the ceramic green sheet 21, drying the ceramic green sheet 21 and the internal electrode pattern 23, stacking a next ceramic green sheet 21 without the internal electrode pattern 23 on the printed and dried internal electrode pattern 23 so as to allow the next ceramic green sheet 21 to temporarily attach to the internal electrode pattern 23, and repeating the attachment of the ceramic green sheet 21 and the printing of the internal electrode pattern 23 sequentially.

Subsequently, the preliminary laminated body is pressed at a temperature and a pressure higher than those during formation of the preliminary laminated body so as to form a laminated body 29 in which the ceramic green sheets 21 and the internal electrode patterns 23 are tightly attached.

The laminated body 29 is then cut along a cutting line h so as to expose the end portions of the internal electrode patterns 23 and to thereby form a capacitor main body material. In this cutting process, the laminated body 29 is cut approximately at the center of the ceramic pattern 25 in the laminated body in a direction perpendicular to the longitudinal direction of the inner electrode pattern 23 (see FIGS. 5(c1) and 5(c2)) and parallel to the longitudinal direction of the inner electrode pattern 23. The internal electrode patterns 23 are not exposed at the side-edges while they are exposed at the end-edges.

The laminated body of the capacitor main body is then fired in a predetermined atmosphere at a predetermined temperature condition to form a capacitor main body 1. In some cases, the capacitor main body may be barrel-polished to bevel the edges of the capacitor main body and to expose the internal electrode layers 7 from the opposing end faces of the capacitor main body 1.

Degreasing is preferably conducted in the temperature up to 500° C. at a heating rate of 5 to 20° C./h. The firing is preferably conducted at a heating rate of 200 to 500° C./h and the maximum of the firing temperature is preferably in the range of 1040 to 1200° C. and a retention time at the maximum temperature is preferably 0.5 to 4 hours in a nitrogen-hydrogen atmosphere. More preferably, the maximum of the firing temperature is preferably in the range of 1050 to 1150° C. By conducting firing under such conditions, the crystal grains 9 constituting the dielectric layers 5 can be made to have a mean diameter in the range of 0.15 to 0.3 μm and to contain two rare earth elements having different ionic radii such that the rare earth elements have the concentration gradients described above. In particular, by conducting the firing with a maximum temperature within the range of 1050° C. to 1150° C., the first rare earth element can be made to have a concentration gradient within the range of −0.0051 to −0.0046 atom %/nm and the second rare earth element can be made to have a concentration gradient within the range of −0.001 to −0.0048 atom %/nm in the crystal grains 9. As a result, a rate of decrease of grain-boundary resistance can be made to be less than 1.09%/min.

After that, a reoxidation treatment is conducted in the temperature range of 900° C. to 1100° C. As a result, a capacitor body 1 is obtained.

Subsequently, an external electrode paste is then applied on the opposing ends of the capacitor main body 1 and baked to form the external electrodes 3. A plating film is formed on each of the external electrodes 3 to enhance the mounting property if desired.

EXAMPLES

Production of Multilayer Ceramic Capacitor

A multilayer ceramic capacitor was produced as follows. BT powders ($BaTiO_3$) and BCT powders ($Ba_{1-x}Ca_xTiO_3$, x=0.05) that were coated with oxides of the first rare earth elements shown in Tables 1, 3, and 5 were prepared as barium titanate powders. The ratios A/B of the BT powders and the BCT powders used were 1 to 1.009.

The preparation of the first powders by coating a BT powder, a BCT powder, or mixed powders of a BT powder and a BCT powder with the rare earth elements was conducted by mixing aqueous solutions containing the first rare earth elements with the powders by a liquid phase method and heating the resultant mixture. For the second rare earth elements, oxide powders having a mean particle diameter of 0.05 μm were used. The added amounts of oxides of the first rare earth elements and oxides of the second rare earth elements are shown in Tables 1, 3, and 5. MgO and MnO were added in the proportions shown in Tables 1, 3, and 5 with respect to 100 molar parts of the BT powder, the BCT powder, and the mixed powders of the BT powder and the BCT powder, serving as the first powders. Herein, MnO was added in the form of $MnCO_3$. The MgO powder and the $MnCO_3$ powder used had a mean particle diameter of 0.2 μm. For a sintering agent, a glass powder that had a mean particle diameter of 0.3 μm and had a composition of $Li_2O$=10, BaO=20, CaO=20, and $SiO_2$=50 (mol %) was used. The adding amount of the glass powder was 1.2 mass parts with respect to 100 parts by mass of a dielectric powder mainly composed of a barium titanate powder.

The dielectric powders, which include BT powder, BCT powder or the mixed powder of the mixed powders of the BT powder and the BCT powder, rare earth oxide powder, MgO powder and $MnCO_3$ powder, are wet-mixed with a mixed solvent of toluene and alcohol in a ball mill using zirconia balls having a diameter of 5 mm. A polyvinyl butyral resin and a mixed solvent of toluene and alcohol were added to the wet mixed dielectric powder, and the resulting mixture was wet-mixed using zirconia balls having the same diameter of 5 mm to prepare ceramic slurry. Ceramic green sheets having a thickness of 2.5 μm were formed from the resulting ceramic slurry by a doctor blade method.

Subsequently, a plurality of rectangular inner electrode patterns mainly composed of Ni was formed on an upper surface of the ceramic green sheet. The conductor paste used in forming the inner electrode patterns contained a Ni powder having an average particle diameter of 0.3 μm. The BT powder used in forming the ceramic green sheet was used as a common material and 30 parts by mass of the BT powder was added to the Ni powder per 100 parts by mass of the Ni powder.

Subsequently, one hundred ceramic green sheets with the inner electrode patterns printed thereon were stacked, and twenty ceramic green sheets with no inner electrode patterns were stacked on the top and the bottom of the stack of the one hundred ceramic green sheets. The resulting stack was processed with a press machine at a temperature of 60° C. and a pressure of $10^7$ Pa for 10 minutes and then cut into a predetermined size.

Subsequently, the resulting laminated bodies were subjected to a binder extraction process in air at a temperature of 300° C. and a heating rate of 10° C./h, and then heating rate was set to 300° C./h and fired for 2 hours at maximum temperature shown in table 1, 3 and 5 in a hydrogen-nitrogen atmosphere. The laminated bodies were then cooled to 1000° C. at a cooling rate of 300° C./h and subjected to a reoxidation process for 4 hours at 1000° C. in a nitrogen atmosphere to prepare capacitor main bodies. Each of the obtained capacitor main bodies was $1\times0.5\times0.5$ $mm^3$ in size and the thickness of the dielectric layer was 1.8 μm. Each of the inner electrodes has effective area of 0.258 $mm^2$ which contributes capacitance.

Subsequently, the resulting capacitor main body was then barrel-polished. An external electrode paste containing a Cu powder and a glass was applied on two ends of the capacitor main body and baked at 850° C. to form external electrodes. A Ni plating layer and then a Sn plating layer were formed on the surface of each external electrode by using an electrolytic barrel to form a multilayer ceramic capacitor.

Evaluation:

These multilayer ceramic capacitors were then evaluated as follows. The relative dielectric constant of the dielectric layer was calculated with using the effective area of the inner electrode and the thickness of the dielectric layer followed by measuring capacitance at a frequency of 1.0 kHz, and a measurement voltage of 0.5 Vrms.

The capacitance was measured at 25° C. and 85° C. at the same frequency and the same measurement voltage as measured the capacitance to calculate the temperature characteristic of the relative dielectric constant (i.e., the temperature characteristic of the capacitance) as a rate of change at 85° C. with respect to the value observed at 25° C. The number of specimens for calculation was 30 for each example.

The mean diameter of crystal grains composed of crystal grains constituting the first crystal group and crystal grains constituting the second crystal group was determined as follows. An image of a polished surface obtained by polishing a section of dielectric layers, the image being projected in a transmission electron microscope, is input into a computer. A diagonal line was drawn on the image on the screen of the computer and the areas of crystal grains on the diagonal line were measured by image processing the contours of the grains. The diameters of the grains were calculated as the diameters of circles having the same areas as the grains. The mean diameter was obtained as a mean value of the resultant diameters of about 50 crystal grains.

The Ca concentration of the crystal grains was determined as follows. About 30 crystal grains present in a polished surface obtained by polishing a section (in lamination direction) of the dielectric layers constituting a multilayer ceramic capacitor were subjected to elemental analysis with a transmission electron microscope equipped with an elemental analysis device. In this analysis, the spot size of electron beams was 5 nm. The analysis was conducted at five points that were present from near the grain boundary to the center of each crystal grain. The crystal grains were selected in the following manner. The areas of crystal grains were measured by image processing on the basis of the contours of the grains. The diameters of the grains were calculated as the diameters of circles having the same areas as the grains. Crystal grains that had the thus-obtained diameters within the range of ±30% from the mean crystal grain diameter were selected as the crystal grains. Crystal grains having a Ca concentration of 0.2 atom % or less were categorized as the first crystal group and crystal grains having a Ca concentration of 0.4 atom % or more were categorized as the second crystal group.

The respective mean diameters of the crystal grains constituting the first crystal group and the crystal grains constituting the second crystal group were calculated from the area data of the crystal grains constituting the first crystal group and the crystal grains constituting the second crystal group, the area data being obtained when the Ca concentration described above was determined. In this case, an image of a polished surface obtained by polishing a section of the dielectric layers, the image being projected in a transmission electron microscope, was input into a computer. The contours of the crystal grains on the screen of the computer were subjected to image processing and the areas of the crystal grains were measured. The diameters of the grains were calculated as the diameters of circles having the same areas as the grains. Each mean diameter was obtained as a mean value of the resultant diameters of about 50 crystal grains.

Following this analysis, the area proportion in terms of the crystal grains constituting the first crystal group and the crystal grains constituting the second crystal group constituting the dielectric layers was calculated from the area data obtained in the above-described determination of a mean diameter of about 50 crystal grains. This area proportion is represented by b/(a+b) wherein a represents the area of crystal grains 1b constituting the first crystal group and b represents the area of crystal grains 1a constituting the second crystal group. In this case, crystal grains having a Ca concentration of more than 0.4 atom % (rounding off the number to the first decimal place) were categorized as the crystal grains of the second crystal group. As shown in Tables 1 to 6, samples in which the BT powder and the BCT powder were mixed had increased proportions of crystal grains having a Ca concentration of 0.4 atom % or more after firing due to diffusion of Ca during the firing in comparison with the mixing proportions of the BT powder and the BCT powder. These samples contained both crystal grains having a Ca concentration of 0.2 atom % or less and crystal grains having a Ca concentration of 0.4 atom % or more.

The concentration gradients of the first rare earth elements and the second rare earth elements from the grain boundary to the center portions of the crystal grains were determined as follows with a transmission electron microscope equipped with an elemental analysis device or Energy Dispersive Spectroscopy (EDS). In this case, a sample to be analyzed was obtained by polishing a multilayer ceramic capacitor in the lamination direction and selecting crystal grains on the resultant polished surface of the dielectric layers.

When the crystal grains were composite grains containing both the first crystal group composed of the crystal grains having a Ca component concentration of 0.2 atom % or less and the second crystal group composed of the crystal grains having a Ca component concentration of 0.4 atom % or more, the crystal grains 9b of the first crystal group and the crystal grains 9a of the second crystal group were selected in accordance with the determination based on the measurement of the Ca concentration described above.

The spot size of electron beams in the elemental analysis was 1 to 3 nm. The analysis was conducted at points that were on a straight line from the grain boundary to the center portion of each crystal grain and were spaced apart from each other at an interval of 5 nm. This measurement was conducted unidirectionally in each crystal grain.

The grain boundary of a crystal grain was defined as a region within 3 nm from the surface of the crystal grain. The center portions of crystal grains were defined as the centers of the inscribed circles of the crystal grains. The inscribed circles of the crystal grains were drawn on an image projected from a transmission electron microscope on the screen of a computer. On the basis of the image on the screen, the center portions of the crystal grains were determined. Each crystal grain was then analyzed from its grain boundary to its center portion and the concentration of the first rare earth element and the concentration of the second rare earth element were determined at each measurement point with respect to the total amount (100%) of Ba, Ti, Ca, Mg, rare earth elements, and Mn determined at each measurement point.

Next, the relationship between the concentrations of the first rare earth element and the second rare earth element determined at each measurement point of the crystal grains and the measurement points was plotted on a graph. The concentration gradients of the first rare earth element and the second rare earth element were determined by a least square method. In this case, the measurement point in the grain boundary was plotted on the origin point side of the graph.

The high temperature loading life was evaluated by the rate of change in resistance at the grain boundaries with an AC impedance method. In this case, As for the high temperature loading conditions, the temperature was 250° C., and the voltage applied to the external electrodes of the multilayer ceramic capacitor was 2 V/μm. The voltage during measurement was 0.1 V, the frequency was 10 mHz to 10 kHz, and the retaining time was 1 hour. The AC impedance before and after this treatment was measured respectively for thirty specimens.

High temperature loading tests were respectively conducted with 30 samples selected from Samples of the same lots at a temperature of 85° C. at an applied voltage of 6.3 V/μm for 1000 hours. In these measurements, samples that exhibited a rate of decrease of grain-boundary resistance of 1.1%/min or less passed the test for 1000 or more hours at a temperature of 85° C. at an applied voltage of 6.3 V/μm.

The composition analysis of the resultant samples, which were multilayer ceramic capacitors, was conducted by ICP analysis and atomic absorption spectroscopy. Specifically, a mixture of dielectric layers cut from each resultant multilayer ceramic capacitor, boric acid and sodium carbonate was melted and dissolved in hydrochloric acid, and the resultant solution was qualitatively analyzed by atomic absorption spectroscopy for elements contained in the dielectric layers. Then, the identified elements were quantified by ICP emission spectroscopy with standard samples obtained by diluting standard solutions of the elements. The amounts of oxygen were measured with the assumption that the elements had valences shown in the periodic table. The resultant compositions of the dielectric layers after firing in Examples matched with the compositions of prepared dielectric layers. This analysis was also used to determine the molar ratio of A to B where A represents the total content of Ba and Ca in moles in the dielectric layers and B represents the content of Ti in moles in the dielectric layers.

In this case, the compositions of sinters determined by treating $MnCO_3$, which was an additive, as MnO matched with the preparation compositions.

Multilayer ceramic capacitors for Comparative Examples were produced by the method described above with samples in which the proportion(s) of the first rare earth element, the second rare earth element, or other components added did not fall within the scope of the present invention; an oxide powder of the first rare earth element and an oxide powder of the second rare earth element were added in one portion; and BT powders and BCT powders having mean particle diameters that did not fall within the scope of the present invention were added. These multilayer ceramic capacitors were evaluated in the same manner as described above. These results are shown in Tables 1 to 6.

TABLE 1

| Sample No. | Barium titanate powder | | | | | | MgO Molar part | $MnCO_3$ Molar part | Rare-earth elements | | | | | | Firing temperature ° C. |
| | BT powder Mole % | Mean particle diameter μm | Ratio A/B | BCT powder Mole % | Mean particle diameter μm | Ratio A/B | | | Type of first rare-earth element | Coating or adding | Coating amount or adding amount Molar part | Type of second rare-earth element | Coating or adding | Coating amount or adding amount Molar part | |
|---|---|---|---|---|---|---|---|---|---|---|---|---|---|---|---|
| *1 | 50 | 0.2 | 1.003 | 50 | 0.2 | 1.003 | 1 | 0.3 | Y | Coating | 4.0 | Tb | Adding | 1.5 | 1100 |
| *2 | 50 | 0.2 | 1.003 | 50 | 0.2 | 1.003 | 1 | 0.3 | Y | Coating | 2.4 | Tb | Adding | 1.3 | 1100 |
| *3 | 50 | 0.2 | 1.003 | 50 | 0.2 | 1.003 | 1 | 0.3 | Y | Coating | 3.5 | Tb | Adding | 1 | 1100 |
| 4 | 50 | 0.2 | 1.003 | 50 | 0.2 | 1.003 | 1 | 0.3 | Y | Coating | 2.0 | Tb | Adding | 1 | 1100 |
| 5 | 50 | 0.2 | 1.003 | 50 | 0.2 | 1.003 | 1 | 0.3 | Y | Coating | 1.5 | Tb | Adding | 0.5 | 1100 |
| 6 | 50 | 0.2 | 1.003 | 50 | 0.2 | 1.003 | 1 | 0.3 | Y | Coating | 1.0 | Tb | Adding | 0.7 | 1100 |
| 7 | 50 | 0.2 | 1.003 | 50 | 0.2 | 1.003 | 1 | 0.3 | Y | Coating | 0.8 | Tb | Adding | 0.5 | 1100 |
| 8 | 50 | 0.2 | 1.003 | 50 | 0.2 | 1.003 | 1 | 0.3 | Y | Coating | 0.7 | Tb | Adding | 0.3 | 1100 |

TABLE 1-continued

|  |  | Barium titanate powder | | | | | | | Rare-earth elements | | | | |
|---|---|---|---|---|---|---|---|---|---|---|---|---|---|
|  |  | | | | | | | | Type of | | Coating | Type of | | Coating | |
| Sample No. | BT pow- der Mole % | Mean particle diam- eter μm | Ratio A/B — | BCT pow- der Mole % | Mean particle diam- eter μm | Ratio A/B — | MgO Molar part | MnCO₃ Molar part | first rare- earth element — | Coating or adding — | amount or adding amount Molar part | second rare- earth element — | Coating or adding — | amount or adding amount Molar part | Firing temper- ature ° C. |
| 9 | 50 | 0.2 | 1.003 | 50 | 0.2 | 1.003 | 1 | 0.3 | Y | Coating | 0.6 | Tb | Adding | 0.2 | 1100 |
| 10 | 50 | 0.2 | 1.003 | 50 | 0.2 | 1.003 | 1 | 0.3 | Y | Coating | 0.6 | Tb | Adding | 0.1 | 1100 |
| * 11 | 50 | 0.2 | 1.003 | 50 | 0.2 | 1.003 | 1 | 0.3 | Y | Coating | 0.6 | Tb | Adding | 0.08 | 1100 |
| * 12 | 50 | 0.2 | 1.003 | 50 | 0.2 | 1.003 | 1 | 0.3 | Y | Coating | 0.5 | Tb | Adding | 0.1 | 1100 |
| * 13 | 50 | 0.2 | 1.003 | 50 | 0.2 | 1.003 | 1 | 0.3 | Y | Coating | 0.5 | Tb | Adding | 0.08 | 1100 |
| * 14 | 50 | 0.2 | 1.003 | 50 | 0.2 | 1.003 | 1 | 0.3 | Y | Coating | 0.3 | Tb | Adding | 0.05 | 1100 |
| * 15 | 50 | 0.2 | 1.003 | 50 | 0.2 | 1.003 | 1 | 0.3 | Y | Adding in one portion | 0.3 | Tb | Adding in one portion | 0.05 | 1100 |
| * 16 | 50 | 0.2 | 1.003 | 50 | 0.2 | 1.003 | 1 | 0.3 | Y | Adding in one portion | 0.7 | Tb | Adding in one portion | 0.3 | 1100 |
| 17 | 50 | 0.2 | 1.003 | 50 | 0.2 | 1.003 | 1 | 0.3 | Ho | Coating | 0.7 | Tb | Adding | 0.3 | 1100 |
| 18 | 50 | 0.2 | 1.003 | 50 | 0.2 | 1.003 | 1 | 0.3 | Er | Coating | 0.7 | Tb | Adding | 0.3 | 1100 |
| 19 | 50 | 0.2 | 1.003 | 50 | 0.2 | 1.003 | 1 | 0.3 | Tm | Coating | 0.7 | Tb | Adding | 0.3 | 1100 |
| 20 | 50 | 0.2 | 1.003 | 50 | 0.2 | 1.003 | 1 | 0.3 | Yb | Coating | 0.7 | Tb | Adding | 0.3 | 1100 |
| 21 | 50 | 0.2 | 1.003 | 50 | 0.2 | 1.003 | 1 | 0.3 | Lu | Coating | 0.7 | Tb | Adding | 0.3 | 1100 |
| 22 | 50 | 0.2 | 1.003 | 50 | 0.2 | 1.003 | 1 | 0.3 | Y | Coating | 0.7 | Sm | Adding | 0.3 | 1100 |
| 23 | 50 | 0.2 | 1.003 | 50 | 0.2 | 1.003 | 1 | 0.3 | Y | Coating | 0.7 | Eu | Adding | 0.3 | 1100 |
| 24 | 50 | 0.2 | 1.003 | 50 | 0.2 | 1.003 | 1 | 0.3 | Y | Coating | 0.7 | Gd | Adding | 0.3 | 1100 |
| 25 | 50 | 0.2 | 1.003 | 50 | 0.2 | 1.003 | 1 | 0.3 | Y | Coating | 0.7 | Dy | Adding | 0.3 | 1100 |
| 26 | 50 | 0.2 | 1.003 | 50 | 0.2 | 1.003 | 1 | 0.3 | Ho | Coating | 0.7 | Sm | Adding | 0.3 | 1100 |
| 27 | 50 | 0.2 | 1.003 | 50 | 0.2 | 1.003 | 1 | 0.3 | Ho | Coating | 0.7 | Eu | Adding | 0.3 | 1100 |
| 28 | 50 | 0.2 | 1.003 | 50 | 0.2 | 1.003 | 1 | 0.3 | Ho | Coating | 0.7 | Gd | Adding | 0.3 | 1100 |
| 29 | 50 | 0.2 | 1.003 | 50 | 0.2 | 1.003 | 1 | 0.3 | Ho | Coating | 0.7 | Dy | Adding | 0.3 | 1100 |
| 30 | 50 | 0.2 | 1.003 | 50 | 0.2 | 1.003 | 1 | 0.3 | Er | Coating | 0.7 | Sm | Adding | 0.3 | 1100 |
| 31 | 50 | 0.2 | 1.003 | 50 | 0.2 | 1.003 | 1 | 0.3 | Er | Coating | 0.7 | Eu | Adding | 0.3 | 1100 |
| 32 | 50 | 0.2 | 1.003 | 50 | 0.2 | 1.003 | 1 | 0.3 | Er | Coating | 0.7 | Gd | Adding | 0.3 | 1100 |
| 33 | 50 | 0.2 | 1.003 | 50 | 0.2 | 1.003 | 1 | 0.3 | Er | Coating | 0.7 | Dy | Adding | 0.3 | 1100 |

* Asterisked samples do not fall within the scope of the present invention.
** "Coating" refers to coating a barium titanate powder with a rare-earth element by a liquid phase method.
"Adding" refers to adding an oxide powder of a rare-earth element to a barium titanate powder.
"Adding in one portion" refers to simultaneously adding oxide powders of two types of rare-earth elements.

TABLE 2

| Sample No. | Mean diameter of crystal grains of first crystal group μm | Mean diameter of crystal grains of second crystal group μm | b/(a + b) ** | Mean diameter of crystal grains *** μm | Ratio A/B | Concen- tration gradient of first rare-earth element atm %/nm | Concen- tration gradient of second rare-earth element atm %/nm | Relative di- electric constant | Temperature characteristic of capacitance (85° C.) % | Decrease rate of grain- boundary resistance %/min | High tem- perature loading test for 1000 hours # |
|---|---|---|---|---|---|---|---|---|---|---|---|
| * 1 | 0.17 | 0.19 | 0.75 | 0.185 | 1.003 | −0.040 | −0.004 | 1360 | −10.1 | 0.54 | Good |
| * 2 | 0.17 | 0.19 | 0.75 | 0.185 | 1.003 | −0.070 | −0.0066 | 1750 | −11.2 | 0.60 | Good |
| * 3 | 0.17 | 0.19 | 0.75 | 0.185 | 1.003 | −0.061 | −0.0047 | 1780 | −12.0 | 0.67 | Good |
| 4 | 0.17 | 0.19 | 0.75 | 0.185 | 1.003 | −0.046 | −0.0048 | 2110 | −12.2 | 0.60 | Good |
| 5 | 0.17 | 0.19 | 0.75 | 0.185 | 1.003 | −0.030 | −0.0029 | 2190 | −12.2 | 0.67 | Good |
| 6 | 0.17 | 0.19 | 0.75 | 0.185 | 1.003 | −0.015 | −0.0017 | 2230 | −12.8 | 0.66 | Good |
| 7 | 0.17 | 0.19 | 0.75 | 0.185 | 1.003 | −0.011 | −0.0013 | 2400 | −13.1 | 0.70 | Good |
| 8 | 0.17 | 0.19 | 0.75 | 0.185 | 1.003 | −0.0073 | −0.00099 | 2760 | −13.6 | 0.75 | Good |
| 9 | 0.17 | 0.19 | 0.75 | 0.185 | 1.003 | −0.0067 | −0.00071 | 2850 | −13.5 | 0.89 | Good |
| 10 | 0.17 | 0.19 | 0.75 | 0.185 | 1.003 | −0.0051 | −0.00053 | 2920 | −14.0 | 0.97 | Good |
| * 11 | 0.17 | 0.19 | 0.75 | 0.185 | 1.003 | −0.0053 | −0.00043 | 2970 | −15.9 | 1.11 | Poor |
| * 12 | 0.17 | 0.19 | 0.75 | 0.185 | 1.003 | −0.0034 | −0.00055 | 2800 | −16.3 | 1.67 | Poor |
| * 13 | 0.17 | 0.19 | 0.75 | 0.185 | 1.003 | −0.0040 | −0.00041 | 2760 | −17.9 | 1.59 | Poor |
| * 14 | 0.17 | 0.19 | 0.75 | 0.185 | 1.003 | −0.0022 | −0.00018 | 2990 | −18.6 | 3.19 | Poor |
| * 15 | 0.17 | 0.19 | 0.75 | 0.185 | 1.003 | −0.0022 | −0.00018 | 2880 | −18.4 | 2.10 | Poor |
| * 16 | 0.17 | 0.19 | 0.75 | 0.185 | 1.003 | −0.0025 | −0.0020 | 1690 | −18.4 | 1.21 | Poor |
| 17 | 0.17 | 0.19 | 0.75 | 0.185 | 1.003 | −0.028 | −0.003 | 2200 | −14.3 | 0.80 | Good |
| 18 | 0.17 | 0.19 | 0.75 | 0.185 | 1.003 | −0.029 | −0.029 | 2170 | −14.3 | 0.81 | Good |
| 19 | 0.17 | 0.19 | 0.75 | 0.185 | 1.003 | −0.031 | −0.0031 | 2150 | −14.4 | 0.81 | Good |
| 20 | 0.17 | 0.19 | 0.75 | 0.185 | 1.003 | −0.032 | −0.0029 | 2120 | −14.4 | 0.87 | Good |
| 21 | 0.17 | 0.19 | 0.75 | 0.185 | 1.003 | −0.032 | −0.003 | 2190 | −14.5 | 0.90 | Good |
| 22 | 0.17 | 0.19 | 0.75 | 0.185 | 1.003 | −0.028 | −0.0026 | 2240 | −14.9 | 0.81 | Good |
| 23 | 0.17 | 0.19 | 0.75 | 0.185 | 1.003 | −0.027 | −0.0028 | 2210 | −14.8 | 0.83 | Good |

TABLE 2-continued

| Sample No. | Mean diameter of crystal grains of first crystal group μm | Mean diameter of crystal grains of second crystal group μm | b/(a + b) ** | Mean diameter of crystal grains *** μm | Ratio A/B | Concentration gradient of first rare-earth element atm %/nm | Concentration gradient of second rare-earth element atm %/nm | Relative dielectric constant | Temperature characteristic of capacitance (85° C.) % | Decrease rate of grain-boundary resistance %/min | High temperature loading test for 1000 hours # |
|---|---|---|---|---|---|---|---|---|---|---|---|
| 24 | 0.17 | 0.19 | 0.75 | 0.185 | 1.003 | −0.029 | −0.0029 | 2200 | −14.8 | 0.86 | Good |
| 25 | 0.17 | 0.19 | 0.75 | 0.185 | 1.003 | −0.029 | −0.0031 | 2190 | −14.7 | 0.90 | Good |
| 26 | 0.17 | 0.19 | 0.75 | 0.185 | 1.003 | −0.028 | −0.0026 | 2250 | −14.7 | 0.86 | Good |
| 27 | 0.17 | 0.19 | 0.75 | 0.185 | 1.003 | −0.027 | −0.0027 | 2230 | −14.7 | 0.87 | Good |
| 28 | 0.17 | 0.19 | 0.75 | 0.185 | 1.003 | −0.028 | −0.0029 | 2210 | −14.6 | 0.87 | Good |
| 29 | 0.17 | 0.19 | 0.75 | 0.185 | 1.003 | −0.029 | −0.003 | 2210 | −14.6 | 0.90 | Good |
| 30 | 0.17 | 0.19 | 0.75 | 0.185 | 1.003 | −0.029 | −0.0025 | 2230 | −14.7 | 0.90 | Good |
| 31 | 0.17 | 0.19 | 0.75 | 0.185 | 1.003 | −0.030 | −0.0027 | 2200 | −14.7 | 0.90 | Good |
| 32 | 0.17 | 0.19 | 0.75 | 0.185 | 1.003 | −0.029 | −0.0028 | 2180 | −14.7 | 0.91 | Good |
| 33 | 0.17 | 0.19 | 0.75 | 0.185 | 1.003 | −0.031 | −0.0029 | 2170 | −14.8 | 0.93 | Good |

* Asterisked samples do not fall within the scope of the present invention.
** b/(a + b): area ratio of BCT crystal grains where a represents the area of crystal grains of the first crystal group and b represents the area of crystal grains of the second crystal group
*** Mean diameter of both crystal grains constituting the first crystal group and crystal grains constituting the second crystal group
; Good: sample that passed the test for 1000 hours under high temperature loading conditions of at 85° C. at 6.3 V/μm,
Poor: sample that failed the test before the lapse of 1000 hours under the same conditions

TABLE 3

| | Sample No. | Barium titanate powder | | | | | | MgO Molar part | MnCO₃ Molar part | Rare-earth elements | | | | | Firing temperature ° C. |
|---|---|---|---|---|---|---|---|---|---|---|---|---|---|---|---|
| | | BT powder Mole % | Mean particle diameter μm | Ratio A/B | BCT powder Mole % | Mean particle diameter μm | Ratio A/B | | | Type of first rare-earth element | Coating or adding | Coating amount or adding amount Molar part | Type of second rare-earth element | Coating or adding | Coating amount or adding amount Molar part | |
| | 34 | 50 | 0.2 | 1.003 | 50 | 0.2 | 1.003 | 1 | 0.3 | Tm | Coating | 0.7 | Sm | Adding | 0.3 | 1100 |
| | 35 | 50 | 0.2 | 1.003 | 50 | 0.2 | 1.003 | 1 | 0.3 | Tm | Coating | 0.7 | Eu | Adding | 0.3 | 1100 |
| | 36 | 50 | 0.2 | 1.003 | 50 | 0.2 | 1.003 | 1 | 0.3 | Tm | Coating | 0.7 | Gd | Adding | 0.3 | 1100 |
| | 37 | 50 | 0.2 | 1.003 | 50 | 0.2 | 1.003 | 1 | 0.3 | Tm | Coating | 0.7 | Dy | Adding | 0.3 | 1100 |
| | 38 | 50 | 0.2 | 1.003 | 50 | 0.2 | 1.003 | 1 | 0.3 | Yb | Coating | 0.7 | Sm | Adding | 0.3 | 1100 |
| | 39 | 50 | 0.2 | 1.003 | 50 | 0.2 | 1.003 | 1 | 0.3 | Yb | Coating | 0.7 | Eu | Adding | 0.3 | 1100 |
| | 40 | 50 | 0.2 | 1.003 | 50 | 0.2 | 1.003 | 1 | 0.3 | Yb | Coating | 0.7 | Gd | Adding | 0.3 | 1100 |
| | 41 | 50 | 0.2 | 1.003 | 50 | 0.2 | 1.003 | 1 | 0.3 | Yb | Coating | 0.7 | Dy | Adding | 0.3 | 1100 |
| | 42 | 50 | 0.2 | 1.003 | 50 | 0.2 | 1.003 | 1 | 0.3 | Lu | Coating | 0.7 | Sm | Adding | 0.3 | 1100 |
| | 43 | 50 | 0.2 | 1.003 | 50 | 0.2 | 1.003 | 1 | 0.3 | Lu | Coating | 0.7 | Eu | Adding | 0.3 | 1100 |
| | 44 | 50 | 0.2 | 1.003 | 50 | 0.2 | 1.003 | 1 | 0.3 | Lu | Coating | 0.7 | Gd | Adding | 0.3 | 1100 |
| | 45 | 50 | 0.2 | 1.003 | 50 | 0.2 | 1.003 | 1 | 0.3 | Lu | Coating | 0.7 | Dy | Adding | 0.3 | 1100 |
| * | 46 | 50 | 0.2 | 1.003 | 50 | 0.2 | 1.003 | 1 | 0.3 | Y | Coating | 0.7 | Y | Adding | 0.3 | 1100 |
| * | 47 | 50 | 0.2 | 1.003 | 50 | 0.2 | 1.003 | 1 | 0.3 | Ho | Coating | 0.7 | Ho | Adding | 0.3 | 1100 |
| * | 48 | 50 | 0.2 | 1.003 | 50 | 0.2 | 1.003 | 1 | 0.3 | Er | Coating | 0.7 | Er | Adding | 0.3 | 1100 |
| * | 49 | 50 | 0.2 | 1.003 | 50 | 0.2 | 1.003 | 1 | 0.3 | Tb | Coating | 0.7 | Tb | Adding | 0.3 | 1100 |
| * | 50 | 50 | 0.2 | 1.003 | 50 | 0.2 | 1.003 | 1 | 0.3 | Sm | Coating | 0.7 | Sm | Adding | 0.3 | 1100 |
| * | 51 | 50 | 0.2 | 1.003 | 50 | 0.2 | 1.003 | 1 | 0.3 | Eu | Coating | 0.7 | Eu | Adding | 0.3 | 1100 |
| * | 52 | 50 | 0.2 | 1.003 | 50 | 0.2 | 1.003 | 1 | 0.3 | Tb | Coating | 0.7 | Y | Adding | 0.3 | 1100 |
| * | 53 | 50 | 0.2 | 1.003 | 50 | 0.2 | 1.003 | 1 | 0.3 | Y | Coating | 0.7 | Nd | Adding | 0.3 | 1100 |
| * | 54 | 50 | 0.2 | 1.003 | 50 | 0.2 | 1.003 | 1 | 0.3 | Sm | Coating | 0.7 | Tb | Adding | 0.3 | 1100 |
| | 55 | 100 | 0.2 | 1.003 | 0 | — | — | 1 | 0.3 | Y | Coating | 0.7 | Tb | Adding | 0.3 | 1100 |
| | 56 | 0 | — | — | 100 | 0.2 | 1.003 | 1 | 0.3 | Y | Coating | 0.7 | Tb | Adding | 0.3 | 1100 |
| | 57 | 50 | 0.2 | 1.003 | 50 | 0.2 | 1 | 1 | 0.3 | Y | Coating | 0.7 | Tb | Adding | 0.3 | 1100 |
| | 58 | 50 | 0.2 | 1.003 | 50 | 0.2 | 1.007 | 1 | 0.3 | Y | Coating | 0.7 | Tb | Adding | 0.3 | 1100 |
| | 59 | 50 | 0.2 | 1.003 | 50 | 0.2 | 1.009 | 1 | 0.3 | Y | Coating | 0.7 | Tb | Adding | 0.3 | 1100 |
| | 60 | 50 | 0.15 | 1.003 | 50 | 0.15 | 1.003 | 1 | 0.3 | Y | Coating | 0.7 | Tb | Adding | 0.3 | 1100 |
| | 61 | 50 | 0.3 | 1.003 | 50 | 0.3 | 1.003 | 1 | 0.3 | Y | Coating | 0.7 | Tb | Adding | 0.3 | 1100 |
| | 62 | 50 | 0.3 | 1.003 | 50 | 0.25 | 1.003 | 1 | 0.3 | Y | Coating | 0.7 | Tb | Adding | 0.3 | 1100 |
| | 63 | 50 | 0.2 | 1.003 | 50 | 0.3 | 1.003 | 1 | 0.3 | Y | Coating | 0.7 | Tb | Adding | 0.3 | 1100 |
| * | 64 | 50 | 0.2 | 1.003 | 50 | 0.2 | 1.003 | 1 | 0.3 | Y | Coating | 0.3 | Tb | Adding | 0.7 | 1100 |
| * | 65 | 50 | 0.2 | 1.003 | 50 | 0.2 | 1.003 | 1 | 0.3 | Y | Coating | 0.7 | Tb | Adding | 0.7 | 1100 |

* Asterisked samples do not fall within the scope of the present invention.
** "Coating" refers to coating a barium titanate powder with a rare-earth element by a liquid phase method.
"Adding" refers to adding an oxide powder of a rare-earth element to a barium titanate powder.
"Adding in one portion" refers to simultaneously adding oxide powders of two types of rare-earth elements.

TABLE 4

| Sample No. | Mean diameter of crystal grains of first crystal group μm | Mean diameter of crystal grains of second crystal group μm | b/(a + b) ** | Mean diameter of crystal grains *** μm | Ratio A/B | Concentration gradient of first rare-earth element atm %/nm | Concentration gradient of second rare-earth element atm %/nm | Relative dielectric constant | Temperature characteristic of capacitance (85° C.) % | Decrease rate of grain-boundary resistance %/min | High temperature loading test for 1000 hours # |
|---|---|---|---|---|---|---|---|---|---|---|---|
| 34 | 0.17 | 0.19 | 0.75 | 0.185 | 1.003 | −0.030 | −0.0028 | 2200 | −14.8 | 0.92 | Good |
| 35 | 0.17 | 0.19 | 0.75 | 0.185 | 1.003 | −0.033 | −0.0027 | 2180 | −14.8 | 0.92 | Good |
| 36 | 0.17 | 0.19 | 0.75 | 0.185 | 1.003 | −0.031 | −0.003 | 2160 | −14.8 | 0.96 | Good |
| 37 | 0.17 | 0.19 | 0.75 | 0.185 | 1.003 | −0.032 | −0.0032 | 2150 | −14.9 | 0.97 | Good |
| 38 | 0.17 | 0.19 | 0.75 | 0.185 | 1.003 | −0.033 | −0.0027 | 2170 | −14.8 | 1.00 | Good |
| 39 | 0.17 | 0.19 | 0.75 | 0.185 | 1.003 | −0.034 | −0.0028 | 2160 | −14.8 | 1.05 | Good |
| 40 | 0.17 | 0.19 | 0.75 | 0.185 | 1.003 | −0.033 | −0.003 | 2140 | −14.8 | 1.08 | Good |
| 41 | 0.17 | 0.19 | 0.75 | 0.185 | 1.003 | −0.032 | −0.0031 | 2140 | −14.9 | 1.08 | Good |
| 42 | 0.17 | 0.19 | 0.75 | 0.185 | 1.003 | −0.036 | −0.0028 | 2160 | −14.9 | 1.08 | Good |
| 43 | 0.17 | 0.19 | 0.75 | 0.185 | 1.003 | −0.036 | −0.0029 | 2160 | −14.9 | 1.08 | Good |
| 44 | 0.17 | 0.19 | 0.75 | 0.185 | 1.003 | −0.037 | −0.0032 | 2140 | −14.9 | 1.08 | Good |
| 45 | 0.17 | 0.19 | 0.75 | 0.185 | 1.003 | −0.036 | −0.0032 | 2130 | −15.0 | 1.08 | Good |
| * 46 | 0.17 | 0.19 | 0.75 | 0.185 | 1.003 | −0.049 | — | 2010 | −13.2 | 1.72 | Poor |
| * 47 | 0.17 | 0.19 | 0.75 | 0.185 | 1.003 | −0.053 | — | 2100 | −14.5 | 1.60 | Poor |
| * 48 | 0.17 | 0.19 | 0.75 | 0.185 | 1.003 | −0.048 | — | 2210 | −13.4 | 1.55 | Poor |
| * 49 | 0.17 | 0.19 | 0.75 | 0.185 | 1.003 | −0.045 | — | 2210 | −14.5 | 1.77 | Poor |
| * 50 | 0.17 | 0.19 | 0.75 | 0.185 | 1.003 | −0.043 | — | 2210 | −14.0 | 1.88 | Poor |
| * 51 | 0.17 | 0.19 | 0.75 | 0.185 | 1.003 | −0.040 | — | 2210 | −14.9 | 1.67 | Poor |
| * 52 | 0.17 | 0.19 | 0.75 | 0.185 | 1.003 | −0.0047 | −0.047 | 2170 | −15.7 | 1.74 | Poor |
| * 53 | 0.17 | 0.19 | 0.75 | 0.185 | 1.003 | −0.0073 | −0.0005 | 2060 | −15.6 | 1.70 | Poor |
| * 54 | 0.17 | 0.19 | 0.75 | 0.185 | 1.003 | −0.005 | −0.00099 | 2040 | −15.4 | 1.68 | Poor |
| 55 | 0.17 | — | 0 | 0.17 | 1.003 | −0.0074 | −0.001 | 2280 | −15.9 | 0.85 | Good |
| 56 | — | 0.19 | 1 | 0.19 | 1.003 | −0.0072 | −0.00098 | 1760 | −12.8 | 0.88 | Good |
| 57 | 0.17 | 0.19 | 0.75 | 0.185 | 1.0015 | −0.0073 | −0.00099 | 2750 | −14.0 | 1.09 | Good |
| 58 | 0.15 | 0.19 | 0.75 | 0.18 | 1.005 | −0.0073 | −0.00099 | 2690 | −13.9 | 0.80 | Good |
| 59 | 0.17 | 0.19 | 0.75 | 0.185 | 1.006 | −0.0073 | −0.00099 | 2310 | −15.1 | 0.87 | Good |
| 60 | 0.13 | 0.16 | 0.75 | 0.153 | 1.003 | −0.0069 | −0.00095 | 1770 | −14.2 | 0.76 | Good |
| 61 | 0.26 | 0.28 | 0.75 | 0.28 | 1.003 | −0.0080 | −0.001 | 3140 | −14.8 | 1.02 | Good |
| 62 | 0.26 | 0.24 | 0.75 | 0.25 | 1.003 | −0.0080 | −0.00099 | 3070 | −14.7 | 1.04 | Good |
| 63 | 0.19 | 0.28 | 0.75 | 0.26 | 1.003 | −0.0073 | −0.001 | 3100 | −14.6 | 1.01 | Good |
| * 64 | 0.17 | 0.19 | 0.75 | 0.185 | 1.003 | −0.0067 | −0.0012 | 2800 | −14.1 | 1.15 | Poor |
| * 65 | 0.17 | 0.19 | 0.75 | 0.185 | 1.003 | −0.0067 | −0.0012 | 2700 | −14.2 | 1.12 | Poor |

* Asterisked samples do not fall within the scope of the present invention.
** b/(a + b): area ratio of BCT crystal grains where a represents the area of crystal grains of the first crystal group and b represents the area of crystal grains of the second crystal group
*** Mean diameter of both crystal grains constituting the first crystal group and crystal grains constituting the second crystal group
; Good: sample that passed the test for 1000 hours under high temperature loading conditions of at 85° C. at 6.3 V/μm.
Poor: sample that failed the test before the lapse of 1000 hours under the same conditions

TABLE 5

| Sample No. | Barium titanate powder ||||||  MgO Molar part | MnCO₃ Molar part | Rare-earth elements ||||| Firing temperature ° C. |
|---|---|---|---|---|---|---|---|---|---|---|---|---|---|---|
| | BT powder Mole % | Mean particle diameter μm | Ratio A/B | BCT powder Mole % | Mean particle diameter μm | Ratio A/B | | | Type of first rare-earth element | Coating or adding | Coating amount or adding amount Molar part | Type of second rare-earth element | Coating or adding | Coating amount or adding amount Molar part | |
| 66 | 30 | 0.2 | 1.003 | 70 | 0.2 | 1.003 | 1 | 0.3 | Y | Coating | 0.7 | Tb | Adding | 0.3 | 1100 |
| 67 | 40 | 0.2 | 1.003 | 60 | 0.2 | 1.003 | 1 | 0.3 | Y | Coating | 0.7 | Tb | Adding | 0.3 | 1100 |
| 68 | 60 | 0.2 | 1.003 | 40 | 0.2 | 1.003 | 1 | 0.3 | Y | Coating | 0.7 | Tb | Adding | 0.3 | 1100 |
| 69 | 70 | 0.2 | 1.003 | 30 | 0.2 | 1.003 | 1 | 0.3 | Y | Coating | 0.7 | Tb | Adding | 0.3 | 1100 |
| * 70 | 50 | 0.2 | 1.003 | 50 | 0.2 | 1.003 | 0 | 0.3 | Y | Coating | 0.7 | Tb | Adding | 0.3 | 1100 |
| 71 | 50 | 0.2 | 1.003 | 50 | 0.2 | 1.003 | 0.5 | 0.3 | Y | Coating | 0.7 | Tb | Adding | 0.3 | 1100 |
| 72 | 50 | 0.2 | 1.003 | 50 | 0.2 | 1.003 | 2 | 0.3 | Y | Coating | 0.7 | Tb | Adding | 0.3 | 1100 |
| * 73 | 50 | 0.2 | 1.003 | 50 | 0.2 | 1.003 | 2.5 | 0.3 | Y | Coating | 0.7 | Tb | Adding | 0.3 | 1100 |
| 74 | 50 | 0.2 | 1.003 | 50 | 0.2 | 1.003 | 1 | 0 | Y | Coating | 0.7 | Tb | Adding | 0.3 | 1100 |
| 75 | 50 | 0.2 | 1.003 | 50 | 0.2 | 1.003 | 1 | 0.2 | Y | Coating | 0.7 | Tb | Adding | 0.3 | 1100 |
| 76 | 50 | 0.2 | 1.003 | 50 | 0.2 | 1.003 | 1 | 0.5 | Y | Coating | 0.7 | Tb | Adding | 0.3 | 1100 |
| * 77 | 50 | 0.2 | 1.003 | 50 | 0.2 | 1.003 | 1 | 0.8 | Y | Coating | 0.7 | Tb | Adding | 0.3 | 1100 |
| 78 | 50 | 0.2 | 1.003 | 50 | 0.2 | 1.003 | 1.5 | 0.4 | Y | Coating | 0.7 | Tb | Adding | 0.3 | 1100 |
| * 79 | 50 | 0.12 | 1.003 | 50 | 0.12 | 1.003 | 1.5 | 0.4 | Y | Coating | 0.7 | Tb | Adding | 0.3 | 1100 |
| * 80 | 50 | 0.4 | 1.003 | 50 | 0.4 | 1.003 | 1.5 | 0.4 | Y | Coating | 0.7 | Tb | Adding | 0.3 | 1100 |
| 81 | 50 | 0.17 | 1.003 | 50 | 0.17 | 1.003 | 1 | 0.3 | Y | Coating | 0.7 | Tb | Adding | 0.3 | 1100 |
| * 82 | 50 | 0.17 | 1.003 | 50 | 0.17 | 1.003 | 1 | 0.3 | Y | Coating | 0.7 | Tb | Adding | 0.3 | 1020 |
| 83 | 50 | 0.17 | 1.003 | 50 | 0.17 | 1.003 | 1 | 0.3 | Y | Coating | 0.7 | Tb | Adding | 0.3 | 1040 |
| 84 | 50 | 0.17 | 1.003 | 50 | 0.17 | 1.003 | 1 | 0.3 | Y | Coating | 0.7 | Tb | Adding | 0.3 | 1070 |

TABLE 5-continued

| Sample No. | Barium titanate powder | | | | | | MgO Molar part | MnCO₃ Molar part | Rare-earth elements | | | | | | Firing temperature ° C. |
| | BT powder Mole % | Mean particle diameter μm | Ratio A/B | BCT powder Mole % | Mean particle diameter μm | Ratio A/B | | | Type of first rare-earth element | Coating or adding | Coating amount or adding amount Molar part | Type of second rare-earth element | Coating or adding | Coating amount or adding amount Molar part | |
|---|---|---|---|---|---|---|---|---|---|---|---|---|---|---|---|
| 85 | 50 | 0.17 | 1.003 | 50 | 0.17 | 1.003 | 1 | 0.3 | Y | Coating | 0.7 | Tb | Adding | 0.3 | 1150 |
| 86 | 50 | 0.17 | 1.003 | 50 | 0.17 | 1.003 | 1 | 0.3 | Y | Coating | 0.7 | Tb | Adding | 0.3 | 1200 |
| * 87 | 50 | 0.17 | 1.003 | 50 | 0.17 | 1.003 | 1 | 0.3 | Y | Coating | 0.7 | Tb | Adding | 0.3 | 1220 |

* Asterisked samples do not fall within the scope of the present invention.
** "Coating" refers to coating a barium titanate powder with a rare-earth element by a liquid phase method.
"Adding" refers to adding an oxide powder of a rare-earth element to a barium titanate powder.
"Adding in one portion" refers to simultaneously adding oxide powders of two types of rare-earth elements.

TABLE 6

| Sample No. | Mean diameter of crystal grains of first crystal group μm | Mean diameter of crystal grains of second crystal group μm | b/(a + b) ** | Mean diameter of crystal grains *** μm | Ratio A/B | Concentration gradient of first rare-earth element atm %/nm | Concentration gradient of second rare-earth element atm %/nm | Relative dielectric constant | Temperature characteristic of capacitance (85° C.) % | Decrease rate of grain-boundary resistance %/min | High temperature loading test for 1000 hours # |
|---|---|---|---|---|---|---|---|---|---|---|---|
| 66 | 0.16 | 0.2 | 0.6 | 0.184 | 1.003 | −0.011 | −0.0013 | 2200 | −13.3 | 0.85 | Good |
| 67 | 0.16 | 0.2 | 0.7 | 0.188 | 1.003 | −0.011 | −0.0013 | 2300 | −13.1 | 0.71 | Good |
| 68 | 0.17 | 0.19 | 0.8 | 0.186 | 1.003 | −0.011 | −0.0013 | 2350 | −13.1 | 0.72 | Good |
| 69 | 0.18 | 0.19 | 0.85 | 0.189 | 1.003 | −0.011 | −0.0013 | 2300 | −13.2 | 0.86 | Good |
| * 70 | 0.18 | 0.2 | 0.75 | 0.195 | 1.003 | −0.003 | −0.0005 | 2300 | −18.2 | 1.20 | Poor |
| 71 | 0.17 | 0.19 | 0.75 | 0.185 | 1.003 | −0.011 | −0.0012 | 2250 | −15.0 | 0.90 | Good |
| 72 | 0.17 | 0.19 | 0.75 | 0.185 | 1.003 | −0.013 | −0.0013 | 2300 | −14.0 | 0.90 | Good |
| * 73 | 0.17 | 0.19 | 0.75 | 0.185 | 1.003 | −0.0016 | −0.0013 | 1700 | −13.2 | 0.80 | Good |
| * 74 | 0.17 | 0.19 | 0.75 | 0.185 | 1.003 | −0.011 | −0.0007 | 2500 | −13.4 | 3.30 | Good |
| 75 | 0.17 | 0.19 | 0.75 | 0.185 | 1.003 | −0.012 | −0.0011 | 2410 | −13.3 | 1.00 | Good |
| 76 | 0.17 | 0.19 | 0.75 | 0.185 | 1.003 | −0.015 | −0.0014 | 2300 | −13.2 | 0.90 | Good |
| * 77 | 0.17 | 0.2 | 0.75 | 0.193 | 1.003 | −0.017 | −0.0016 | 1720 | −13.1 | 1.10 | Good |
| 78 | 0.17 | 0.2 | 0.75 | 0.193 | 1.003 | −0.013 | −0.0013 | 2380 | −13.3 | 0.80 | Good |
| * 79 | 0.13 | 0.14 | 0.75 | 0.138 | 1.003 | −0.050 | −0.005 | 1420 | −14.9 | 0.99 | Good |
| * 80 | 0.41 | 0.42 | 0.75 | 0.418 | 1.003 | −0.005 | −0.0005 | 3760 | −15.9 | 1.90 | Poor |
| 81 | 0.15 | 0.165 | 0.75 | 0.161 | 1.003 | −0.007 | −0.001 | 1880 | −14.3 | 0.80 | Good |
| * 82 | 0.13 | 0.15 | 0.7 | 0.144 | 1.003 | −0.055 | −0.0055 | 1700 | −14.3 | 1.12 | Poor |
| 83 | 0.13 | 0.16 | 0.7 | 0.151 | 1.003 | −0.050 | −0.005 | 1760 | −14.3 | 1.09 | Good |
| 84 | 0.14 | 0.17 | 0.75 | 0.163 | 1.003 | −0.040 | −0.003 | 2070 | −14.6 | 1.01 | Good |
| 85 | 0.2 | 0.23 | 0.75 | 0.223 | 1.003 | −0.010 | −0.001 | 2340 | −14.8 | 1.00 | Good |
| 86 | 0.27 | 0.29 | 0.8 | 0.286 | 1.003 | −0.005 | −0.0005 | 3150 | −15.0 | 1.09 | Good |
| * 87 | 0.3 | 0.32 | 0.85 | 0.317 | 1.003 | −0.004 | −0.0004 | 3210 | −16.4 | 1.30 | Poor |

* Asterisked samples do not fall within the scope of the present invention.
** b/(a + b): area ratio of BCT crystal grains where a represents the area of crystal grains of the first crystal group and b represents the area of crystal grains of the second crystal group
*** Mean diameter of both crystal grains constituting the first crystal group and crystal grains constituting the second crystal group
; Good: sample that passed the test for 1000 hours under high temperature loading conditions of at 85° C. at 6.3 V/μm,
Poor: sample that failed the test before the lapse of 1000 hours under the same conditions As for the samples according to the present invention (Sample Nos. 4 to 10, 17 to 45, 55 to 63, 66 to 69, 71, 72, 75, 76, 78, 81 and 83 to 86), the samples contained 0.5 to 2 molar parts of Mg based on MgO, 0.2 to 0.5 molar parts of Mn based on MnO, and 0.7 to 3 molar parts of at least one rare earth element (RE) selected from Ho, Y, Er, Tm, Yb, Lu, Sm, Eu, Gd, Tb, and Dy based on $RE_2O_3$; the crystal grains contained one first rare earth element selected from Ho, Y, Er, Tm, Yb, and Lu, and one second rare earth element selected from Sm, Eu, Gd, Tb, and Dy such that the first rare earth element was in a larger amount than the second rare earth element; the concentration gradient of the first rare earth element from the grain boundary to the center portion in a crystal grain was −0.005 to −0.05 atom %/nm while the concentration gradient of the second rare earth element from the grain boundary to the center portion in a crystal grain was −0.0005 to −0.005 atom %/nm. As is obvious from the results in Tables 1 to 6, these samples according to the present invention had a relative dielectric constant of 1760 or more, a variation of the relative dielectric constant at 85° C. equal to or more than −15.9%, a rate of decrease of grain-boundary resistance (used as an indicator of high temperature loading life) of 1.09%/min or less, and a high temperature loading life of 1000 hours or more, even when crystal grains mainly composed of barium titanate had a mean diameter of 0.153 to 0.286 μm.

The samples (Sample Nos. 4 to 10, 17 to 45, 57 to 63, 66 to 69, 71, 72, 75, 76, 78, 81 and 83 to 86) in which dielectric layers were composed of composite grains containing both the first crystal group composed of crystal grains having a Ca component concentration of 0.2 atom % or less and the second crystal group composed of crystal grains having a Ca component concentration of 0.4 atom % or more had a relative dielectric constant of 1760 or more and a variation of the relative dielectric constant at 85° C. equal to or more than −15.1%.

The samples (Sample Nos. 4 to 10, 17 to 45, 58, 60 to 63, 66 to 69, 71, 72, 75, 76, 78, 81 and 83 to 86) in which composite grains constituting dielectric layers had an A/B of 1.003 to 1.005 where A represents the total content of Ba and Ca in moles and B represents the content of Ti in moles, had a relative dielectric constant of 1770 or more, a variation of the relative dielectric constant at 85° C. equal to or more than −15%, a rate of decrease of grain-boundary resistance of 1.08%/min or less, and extended high temperature loading life.

In addition, samples (Sample Nos. 4 to 10, 17 to 37, 58, 66 to 69, 71, 72, 75, 76 and 78) in which composite grains constituting dielectric layers had an A/B of 1.003 to 1.005 and a mean grain diameter of 0.165 to 0.193 μm, had a relative dielectric constant of 2110 or more, a variation of the relative dielectric constant at 85° C. equal to or more than −15%, a rate of decrease of grain-boundary resistance of 1%/min or less, and extended high temperature loading life.

In contrast, the samples that did not fall within the scope of the present invention (Sample Nos. 1 to 3, 11 to 16, 46 to 54, 64, 65, 70, 73, 74, 77, 79, 80, 82, and 87) had a relative dielectric constant of 1700 or less, a variation of the relative dielectric constant at 85° C. less than −15.9%, or a rate of decrease of grain-boundary resistance of more than 1.09%/min. These samples did not simultaneously satisfy a relative dielectric constant of 1760 or more, a variation of the relative dielectric constant at 85° C. equal to or more than −15.9%, and a rate of decrease of grain-boundary resistance of 1.09%/min or less.

The invention claimed is:

1. A multilayer ceramic capacitor, comprising ceramic dielectric layers, inner electrode layers between the ceramic dielectric layers and external electrodes electrically connected to the inner electrode layers,
   wherein the ceramic dielectric layer is made of dielectric ceramics comprising crystal grains that have an average grain diameter of 0.15 to 0.3 μm and contain:
   barium titanate as a main component;
   0.5 to 2 molar parts of magnesium based on MgO per 100 molar parts of barium titanate;
   0.2 to 0.5 molar parts of manganese based on MnO per 100 molar parts of barium titanate; and
   0.7 to 3 molar parts of a total amount of one first rare earth element (RE) selected from holmium, yttrium, erbium, thulium, ytterbium and lutetium and one second rare earth element (RE) selected from samarium, europium, gadolinium, terbium and dysprosium, and
   wherein the crystal grains contain the first rare earth element and the second rare earth element such that contain the first rare earth element is contained more than the second rare earth element,
   wherein the concentration gradient of the first rare earth element from the grain boundary to the center of the crystal grain is −0.005 atom %/nm or more and −0.05 atom %/nm or less, and the concentration gradient of the second rare earth element from the grain boundary to the center of the crystal grain is −0.0005 atom %/nm or more and −0.005 atom %/nm or less.

2. The multilayer ceramic capacitor according to claim 1, wherein the crystal grains comprise a first crystal group including crystal grains containing 0.2 or less atom % of Ca and a second crystal group including crystal grains containing 0.4 or more atom % of Ca.

3. The multilayer ceramic capacitor according to claim 2, wherein the relationship of A/B≧1.003 is satisfied where A mole represents the total content of Ba and Ca and B mole represents the content of Ti in the dielectric ceramic.

\* \* \* \* \*